(12) United States Patent
Tornéus et al.

(10) Patent No.: US 11,665,333 B2
(45) Date of Patent: May 30, 2023

(54) SYSTEMS AND METHODS FOR CALIBRATING IMAGE SENSORS IN WEARABLE APPARATUSES

(71) Applicant: Tobii AB, Danderyd (SE)

(72) Inventors: Daniel Tornéus, Danderyd (SE); Torbjörn Sundberg, Danderyd (SE); Magnus Arvidsson, Danderyd (SE)

(73) Assignee: Tobii AB, Danderyd (SE)

(*) Notice: Subject to any disclaimer, the term of this patent is extended or adjusted under 35 U.S.C. 154(b) by 294 days.

(21) Appl. No.: 16/917,657

(22) Filed: Jun. 30, 2020

(65) Prior Publication Data
US 2021/0076026 A1    Mar. 11, 2021

Related U.S. Application Data

(63) Continuation of application No. 16/232,398, filed on Dec. 26, 2018, now abandoned.
(Continued)

(51) Int. Cl.
| *H04N 17/00* | (2006.01) |
| *G06T 7/80* | (2017.01) |
| *G02B 27/00* | (2006.01) |
| *G02B 27/01* | (2006.01) |
| *G06F 3/01* | (2006.01) |

(Continued)

(52) U.S. Cl.
CPC ....... *H04N 17/002* (2013.01); *G02B 27/0093* (2013.01); *G06F 3/012* (2013.01); *G06F 3/013* (2013.01); *G06T 7/50* (2017.01); *G06T 7/80* (2017.01); *H04N 23/56* (2023.01); *G02B 2027/0138* (2013.01);

(Continued)

(58) Field of Classification Search
CPC ...... H04N 17/002; H04N 5/2256; G06T 7/80; G06T 7/50; G06T 2207/30204; G06T 2207/30244; G02B 27/0093; G02B 2027/0138; G06F 3/012; G06F 3/013
USPC ........................................................ 348/187
See application file for complete search history.

(56) References Cited

U.S. PATENT DOCUMENTS

| 6,204,828 B1 | 3/2001 | Amir et al. |
| 7,113,170 B2 | 9/2006 | Lauper et al. |

(Continued)

OTHER PUBLICATIONS

U.S. Appl. No. 16/232,398, "Non-Final Office Action", dated Sep. 6, 2019, 11 pages.

*Primary Examiner* — John W Miller
*Assistant Examiner* — Omer Khalid
(74) *Attorney, Agent, or Firm* — Christopher I. Moylan

(57) ABSTRACT

In one embodiment, a wearable apparatus is provided which may include a holographic film disposed on the wearable apparatus, an eye tracking device including an image sensor and an illuminator, and one or more processors. The processors may be configured to activate the illuminator to illuminate the holographic film and capture, with the image sensor, an image of at least a portion of the holographic film while the holographic film is illuminated. The processors may also be configured to determine a characteristic of the holographic film based on the image and determine, based on the characteristic, a location or an orientation of the image sensor relative to the holographic film. The processors may further be configured to change, based on the location or the orientation of the image sensor relative to the holographic film, at least one calibration parameter of the image sensor.

20 Claims, 20 Drawing Sheets

Related U.S. Application Data

(60) Provisional application No. 62/631,196, filed on Feb. 15, 2018.

(51) Int. Cl.
    *G06T 7/50*         (2017.01)
    *H04N 23/56*      (2023.01)

(52) U.S. Cl.
    CPC ............... *G06T 2207/30168* (2013.01); *G06T 2207/30204* (2013.01); *G06T 2207/30244* (2013.01)

(56) References Cited

U.S. PATENT DOCUMENTS

| | | |
|---|---|---|
| 9,619,020 B2 | 4/2017 | George-Svahn et al. |
| 2013/0169560 A1 | 7/2013 | Cederlund et al. |
| 2014/0247232 A1 | 9/2014 | George-Svahn et al. |
| 2017/0039327 A1* | 2/2017 | Bitran ..................... H04L 67/02 |
| 2017/0201740 A1* | 7/2017 | Gordon ................... G06F 3/012 |
| 2019/0041644 A1* | 2/2019 | Abele ................ G02B 27/0176 |
| 2019/0187482 A1* | 6/2019 | Lanman ............... G02B 26/105 |

* cited by examiner

SYSTEMS AND METHODS FOR CALIBRATING IMAGE SENSORS IN WEARABLE APPARATUSES

CROSS-REFERENCE TO RELATED APPLICATIONS

This application claims the benefit of U.S. Provisional Patent Application No. 62/631,196, filed Feb. 15, 2018, the entire disclosure of which is hereby incorporated by reference, for all purposes, as if fully set forth herein.

BRIEF SUMMARY OF INVENTION

In one embodiment, an augmented reality, virtual reality, or other wearable apparatus is provided. The apparatus may include a holographic film disposed on the wearable apparatus and an eye tracking device including an image sensor and an illuminator, and one or more processors. The processors may be configured to activate the illuminator to illuminate the holographic film and capture, with the image sensor, an image of at least a portion of the holographic film while the holographic film is illuminated. The processors may also be configured to determine a characteristic of the holographic film based on the image and determine, based on the characteristic, at least one of a location or an orientation of the image sensor relative to the holographic film. The processors may further be configured to change, based on at least one of the location or the orientation of the image sensor relative to the holographic film, at least one calibration parameter of the image sensor.

In another embodiment, a method for changing at least one calibration parameter of an image sensor in an eye tracking device of an augmented reality, virtual reality, or other wearable apparatus is provided. The method may include activating an illuminator of an eye tracking device to illuminate a holographic film disposed on a wearable apparatus. The method may also include capturing, with an image sensor of the eye tracking device, an image of at least a portion of the holographic film while the holographic film is illuminated. The method may further include determining a characteristic of the holographic film based on the image. The method may additionally include determining, based on the characteristic, at least one of a location or an orientation of the image sensor relative to the holographic film. The method may moreover include changing, based on the location or the orientation of the image sensor relative to the holographic film, at least one calibration parameter of the image sensor.

In another embodiment, a non-transitory machine-readable medium having instructions stored thereon for changing at least one calibration parameter of an image sensor in an eye tracking device of an augmented reality, virtual reality, or other wearable apparatus is provided. The instructions may be executable by one or more processors to perform a method. The method may include activating an illuminator of an eye tracking device to illuminate a holographic film disposed on a wearable apparatus. The method may also include capturing, with an image sensor of the eye tracking device, an image of at least a portion of the holographic film while the holographic film is illuminated. The method may further include determining a characteristic of the holographic film based on the image. The method may additionally include determining, based on the characteristic, at least one of a location or an orientation of the image sensor relative to the holographic film. The method may moreover include changing, based on the location or the orientation of the image sensor relative to the holographic film, at least one calibration parameter of the image sensor.

BRIEF DESCRIPTION OF DRAWINGS

Embodiments of the present invention are described in conjunction with the appended figures.

Figure 1:
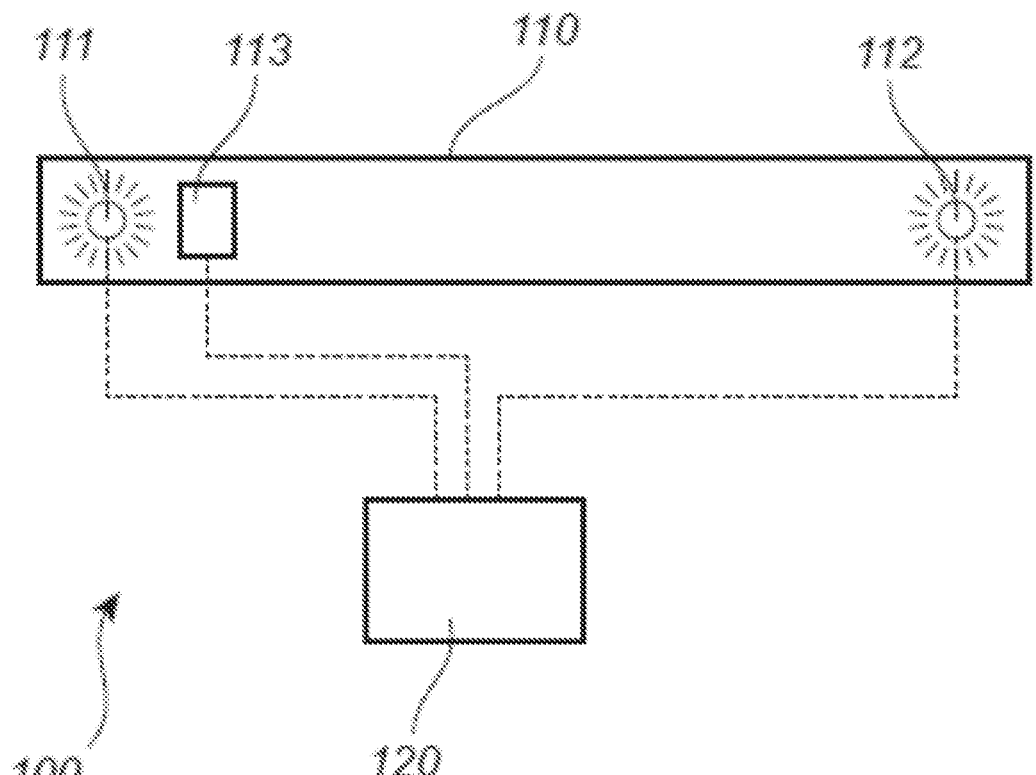
FIG. 1 shows an exemplary eye tracking system.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF INVENTION

The present application relates to gaze detection systems and methods. In an example, such systems and methods are embodied within virtual reality devices, augmented reality devices, and/or other computing devices and support user interactions with such computing devices using gaze information.

Interaction with computing devices is a fundamental action in today's world. Computing devices, such as personal computers, are found throughout daily life. The systems and methods for interacting with such devices defines how they are used, and what they are used for.

Advances in eye tracking technology have made it possible to interact with a computing device using a person's gaze information. In other words, the location on a display the user is gazing at. This information can be used for interaction solely, or in combination with a contact-based interaction technique (e.g., using a user input device, such as a keyboard, a mouse, or a touch screen).

Previously proposed interaction techniques using gaze information can be found in U.S. Pat. No. 6,204,828, United States Patent Application Publication 20130169560, U.S. Pat. No. 7,113,170, United States Patent Application Publication 20140247232, and U.S. Pat. No. 9,619,020. The full specification of these patents and applications are herein incorporated by reference.

Gaze-based interaction techniques are finding their way into wearable computing devices, such as virtual reality (VR) headsets and augmented reality (AR) headsets. These techniques advantageously allow users to control certain aspects of the wearable computing devices (e.g., the user interface, the settings, the content being presented, etc.).

Nonetheless, given the portability of these types of computing devices, many technical challenges arise. For example, the accuracy of the gaze information can degrade for different reasons. A wearable computing device is subject to repeated movements, which can change the alignment of light-processing hardware components. Over time, misalignment decreases the accuracy of the information derived from processing the measured light data. Another reason relates to the dimensions of some of these light-processing hardware components (e.g., the used lens). The dimensions are generally restricted due to the size of the wearable computing device. In turn, the restriction can impact how well light is processed (e.g., transmitted, reflected, distorted, scattered) by the hardware components.

Furthermore, many applications available on wearable computing devices involve the use of external controllers. Using the external controllers to accurately and intuitively interact with virtual objects impacts the usability, success, and failure of such applications. Integrating the virtual world with the external controller and the gaze information has been challenging.

Embodiments of the present disclosure relate to improving the accuracy of detecting gaze information and the usability of applications that rely on external controllers. In the example context of wearable computing devices that use gaze-based interaction techniques, the accuracy can be improved based on a component calibration over time and/or based on a specific component configuration given the overall dimension restrictions. The component calibration generally includes updating gaze-related parameters. In a first example, updating a gaze-related parameter relies on processing of images to determine the position and rotation of the camera and lens based on a marker positioned on the lens. In a second example, updating a gaze-related parameter relies on processing of images to determine a distance between a cornea's center and a lens' center and using this distance to compensate for distortion (e.g., pincushion distortion). In a third example, updating a gaze-related parameter relies on processing of images to determine multiple glint positions and update stereo parameters (e.g., cornea's center and radius, and distance to the camera). Relevant to the specific component configuration, a Fresnel lens is used in an example. A center region of this lens is clear of any Fresnel steps. Instead, the Fresnel steps surround the center region in an annular manner and have varying groove depth and step size. These and other examples are further described herein below. In the interest of clarity of explanation, components of a gaze detection system are described first, followed by a description of how such components can be implemented in a wearable portable device. Thereafter, details of example component calibrations and example Fresnel lens configuration are described. In the example context of wearable computing devices that use gaze-based interaction techniques and external controllers, the gaze of a user on virtual objects in a virtual environment is tracked and a virtual representation of the external controller is presented in the virtual environment. Upon detecting that the user has gazed on a particular object for a period of time, the wearable computing device selects and locks that object. Given the user's touch area of the external controller, the wearable computing device presents a virtual menu to manipulate the locked virtual object. The options on the menu depend on the user's touch area. In this way, the user is able to accurately and intuitively manipulate the locked virtual object by moving his or her finger around the touch area on the external controller.

Eye Tracking

FIG. 1 shows an eye tracking system 100 (which may also be referred to as a gaze tracking system), according to an embodiment. The system 100 comprises illuminators 111 and 112 for illuminating the eyes of a user, and an image sensor 113 for capturing images of the eyes of the user. The illuminators 111 and 112 may for example, be light emitting diodes emitting light in the infrared frequency band, or in the near infrared frequency band. The image sensor 113 may for example be a camera, such as a complementary metal oxide semiconductor (CMOS) camera or a charged coupled device (CCD) camera. The camera is not limited to be an IR camera or a depth camera or a light-field camera. The shutter mechanism of the image sensor can either be a rolling shutter or a global shutter.

A first illuminator 111 is arranged coaxially with (or close to) the image sensor 113 so that the image sensor 113 may capture bright pupil images of the user's eyes. Due to the coaxial arrangement of the first illuminator 111 and the image sensor 113, light reflected from the retina of an eye returns back out through the pupil towards the image sensor 113, so that the pupil appears brighter than the iris surrounding it in images where the first illuminator 111 illuminates the eye. A second illuminator 112 is arranged non-coaxially with (or further away from) the image sensor 113 for capturing dark pupil images. Due to the non-coaxial arrangement of the second illuminator 112 and the image sensor 113, light reflected from the retina of an eye does not reach the image sensor 113 and the pupil appears darker than the iris surrounding it in images where the second illuminator 112 illuminates the eye. The illuminators 111 and 112 may for example, take turns to illuminate the eye, so that every first image is a bright pupil image, and every second image is a dark pupil image.

The eye tracking system 100 also comprises circuitry 120 (for example including one or more processors) for processing the images captured by the image sensor 113. The circuitry 120 may for example, be connected to the image sensor 113 and the illuminators 111 and 112 via a wired or a wireless connection. In another example, circuitry 120 in the form of one or more processors may be provided in one or more stacked layers below the light sensitive surface of the image sensor 113.

Figure 2:
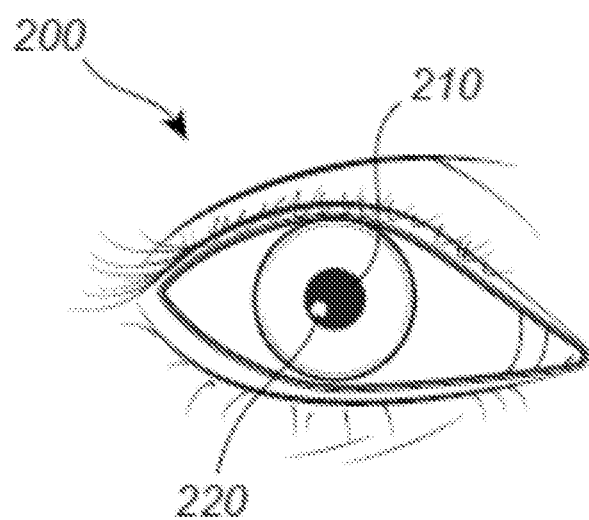
FIG. 2 shows an example image of an eye captured by an image sensor.

FIG. 2 shows an example of an image of an eye 200, captured by the image sensor 113. The circuitry 120 may for example, employ image processing (such as digital image processing) for extracting features in the image. The circuitry 120 may for example employ pupil center cornea reflection (PCCR) eye tracking to determine where the eye 200 is looking. In PCCR eye tracking, the processor 120 estimates the position of the center of the pupil 210 and the position of the center of a glint 220 at the eye 200. The glint 220 is caused by reflection of light from one of the illuminators 111 and 112. The processor 120 calculates where the user is in space using the glint 220 and where the user's eye 200 is pointing using the pupil 210. Since there is typically an offset between the optical center of the eye 200 and the fovea, the processor 120 performs calibration of the fovea offset to be able to determine where the user is looking. The gaze directions obtained from the left eye and from the right eye may then be combined to form a combined estimated gaze direction (or viewing direction). As will be described below, many different factors may affect how the gaze directions for the left and right eyes should be weighted relative to each other when forming this combination.

In the embodiment described with reference to FIG. 1, the illuminators 111 and 112 are arranged in an eye tracking module 110 placed below a display watched by the user. This arrangement serves only as an example. It will be appreciated that more or less any number of illuminators and image sensors may be employed for eye tracking, and that such illuminators and image sensors may be distributed in many different ways relative to displays watched by the user. It will be appreciated that the eye tracking scheme described in the present disclosure may, for example, be employed for remote eye tracking (for example in a personal computer, a smart phone, or integrated in a vehicle) or for wearable eye tracking (such as in virtual reality glasses or augmented reality glasses).

Figure 3:
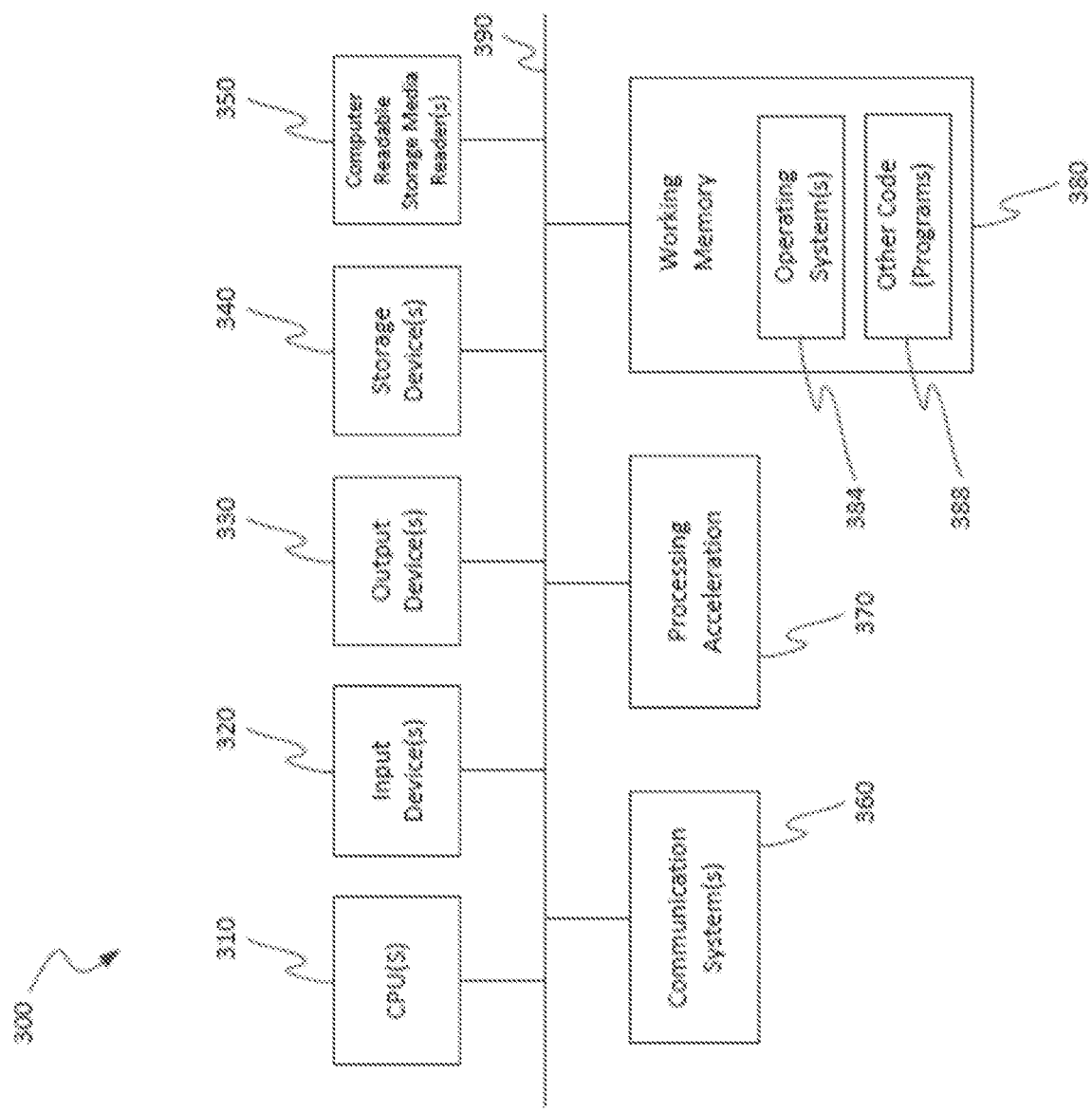
FIG. 3 shows a specialized computer system.

FIG. 3 is a block diagram illustrating a specialized computer system 300 in which embodiments of the present disclosure may be implemented. This example illustrates a specialized computer system 300 such as may be used, in whole, in part, or with various modifications, to provide the functions of components described herein.

Specialized computer system 300 is shown comprising hardware elements that may be electrically coupled via a bus 390. The hardware elements may include one or more central processing units 310, one or more input devices 320 (e.g., a mouse, a keyboard, eye tracking device, etc.), and one or more output devices 330 (e.g., a display device, a printer, etc.). Specialized computer system 300 may also include one or more storage devices 340. By way of example, storage device(s) 340 may be disk drives, optical storage devices, solid-state storage devices such as a random access memory ("RAM") and/or a read-only memory ("ROM"), which can be programmable, flash-updateable and/or the like.

Specialized computer system 300 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above. In some embodiments, specialized computer system 300 may also include a processing acceleration unit 370, which can include a digital signal processor, a special-purpose processor and/or the like.

Wearable Computing Device Implementing Eye Tracking

Figure 4:
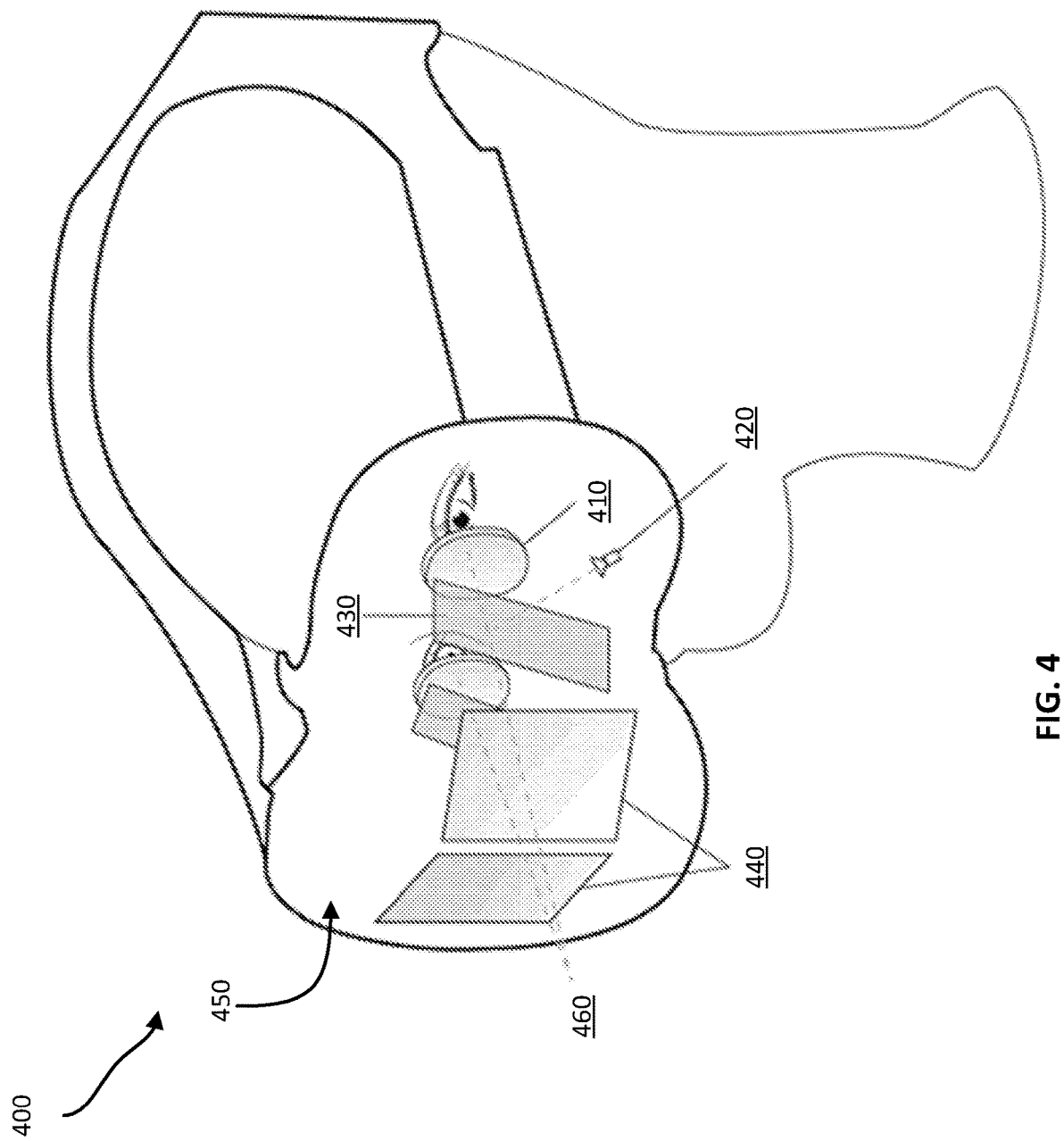
FIG. 4 shows an exemplary wearable computing device.

FIG. 4 shows an example of a wearable computing device 400 that implements some or all of the above components of an eye tracking system as described in connection with FIGS. 1-2. The wearable computing device 400 can be a VR headset or an AR headset that can be worn by a user. As illustrated, the wearable computing device 400 includes a set of lenses 410, such as Fresnel lenses, a set of cameras 420, a set of hot mirrors 430 (e.g., as further illustrated in FIGS. 12-14, the set includes two hot mirrors for each eye in various embodiments), and a set of displays 440. The camera 420 can include the image sensors 113 of FIG. 1. Although not shown in FIG. 4, the wearable computing device 400 can also include a set of illuminators and processing circuitry. These and other components can be integrated within a housing 450 of the wearable computing device 400. In this way, upon the user mounting the wearable computing device 400 on his or her head, the set of lenses 410 would be relatively close to the user's eyes and the set of displays would be relatively far from the user's eye, and the remaining components may be located in between. The arrangement of these components allows the detection of the user's gaze point in three dimensional virtual or real space.

Figure 5:
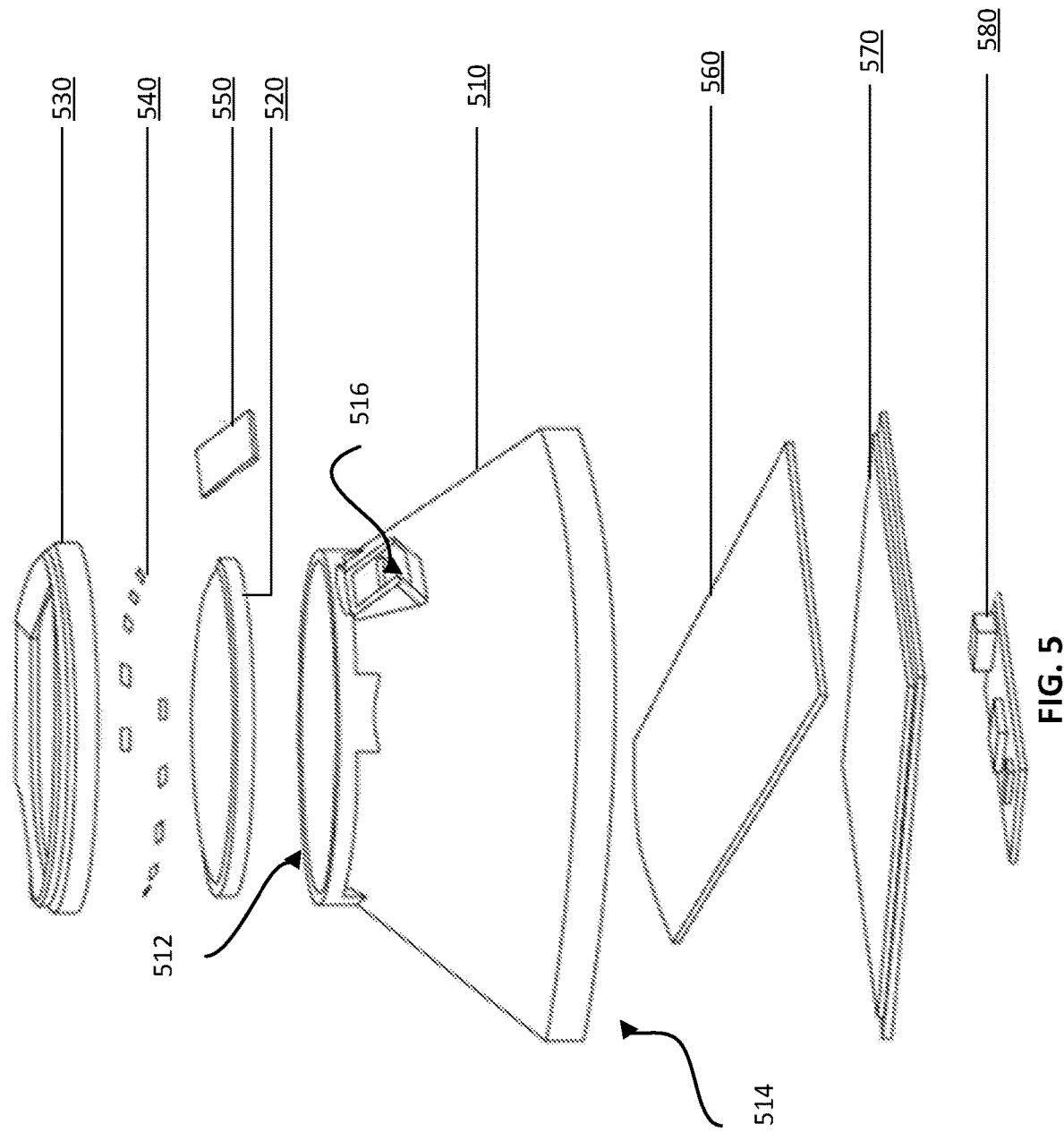
FIG. 5 shows an example components of a virtual reality headset.

FIG. 5 shows example components of a VR headset that implements some or all of the above components of an eye tracking system and specialized computer system as described in connection with FIGS. 1-5. As illustrated, the components include a lens cup 510 (also can be referred to as lens tube). In an example, the lens cup 510 is a housing made of rigid material, such as plastic, and includes two opposite openings 512 and 514 along a traversing axis. The shape of the lens cup 510 is substantially a partial cone-like (or funnel-like) housing along that axis, with the first opening 512 replacing the conical peak of a full cone and the second opening 514 at the base. A head-mounted (HMD) lens 520 is installed in the first opening 512 and secured with an illuminator cover 530. Light illuminators 540 are disposed within the cover 530 and are external to the lens cup 510. Alternatively, the illuminators 540 may be exposed without the cover 530. The light illuminators 540 can include a set of light emitting diodes (LEDs) that emit light in the infrared or near infrared spectrum. A side of the lens cup 510 includes an opening and walls that form a chamber 516. A camera module 550 is installed in the chamber and its optical sensor faces the opening of the chamber 516. The components also include a hot mirror 560, a VR display 570, and an electronic board 580. The hot mirror 560 is installed externally to the lens cup 510 at a location proximate to the second opening 514. The VR display 570 is installed behind the hot mirror 560 relative to the second opening 514 (e.g., is farther away from the second opening 514). The electronic board 580 includes some or all of the components of the specialized computer system 300 of FIG. 3 (e.g., CPU, storage device, computer readable storage media reader, communication system, processing acceleration unit, and working memory).

Hardware Calibration Based on Position and Rotation of Camera and Lens During Usage Generally, a wearable computing device, as the one illustrated in FIGS. 4-5, is not stable (shaky) because of the user's random movement. For example, a sudden drop may cause the movement of internal components, especially the camera and lens. The misalignment of the camera and lens results in inaccurate eye tracking. To account for the misalignment and improve the accuracy, calibration can be used.

In existing systems, the calibration would involve manually disassembling the wearable computing device and reinstalling those components into correct positions. And then starting the gaze calibration process from the beginning, which means various parameters (e.g. focal length of the lens, lens diameter, focal length/FOV of the camera, camera position & orientation, hot mirrors' positions, camera's imaging parameters, illumination parameters and etc.) are needed to be used for the calibration process.

Instead, embodiments of the present disclosure simplify the calibration process significantly. For example, the calibration includes determining the misalignment based on the position and/or rotation of the camera and lens and accounting for the position and/or rotation in the computation of the gaze information.

A technical challenge for using this type of calibration is that there is no direct way to determine the position and rotation of the camera and lens during usage. The embodiments of the present disclosure use an indirect way by putting and relying on a marker on the lens. Instead of considering the aforementioned parameters, a distance between the camera (e.g., a position of the image sensor plane or surface) and the marker on the lens (e.g., the x and y coordinates of the marker) is computed based on one or more images captured by the camera. By using the distance value, the eye tracking system may adjust the camera's calibration parameters (e.g. imaging parameters, focal length, distortion parameters) and illumination parameters. The camera can either be (i) at least one image sensor with optic arrangement; or (ii) at least one lenseless camera without optic arrangement, but with an ultra-thin optical phased array (OPA) which manipulates the incoming light to capture an image without using traditional lenses.

In an example, the embodiments of the present disclosure include storing the original distance and newly updated distance history information. The storage can be local to the wearable computing device or remote (e.g., retrievable from remote server upon user identification). The distance is estimated by using images captured by an eye tracking camera (e.g. IR camera), referred to herein as "camera." Each one of those images that captured for hardware calibration is stored locally or remoted in non-volatitle (e.g. flash) memory. Whenever the wearable computing device is booted up, a new image can be captured as described herein. The newly captured image can be captured with the stored most recent (at least one) image to identify if any relative movement of the marker occurred. If so, at least the newly captured image is further analyzed to perform a calibration. Otherwise, the calibration is skipped.

The marker is at the same side of the camera and can be placed on and/or embedded within one of the lenses; preferably. If there are two or more lenses, one or more markers are placed on and/or embedded within each of the lenses because any accidental drop may cause inconsistent movement for each one of the lenses and its corresponding components. This type of calibration can also be used in other scenarios. For example, one or more of the lenses can be moved to compensate for visual artefacts such as nearsightedness or farsightedness. In this scenario, the optical settings could be visually detected in a similar manner (e.g., by relying on a camera-to-marker distance and/or x and y coordinates of the marker). The marker can be a cross mark, dot pattern (e.g. in-lens LED illuminator pattern), or a line. The marker can be placed in each one or some of the optics of the lens group. For example, the marker can be placed on the one or more layers of the Fresnel lens, and even on the hot mirror. Different markers can be used in different lens elements. For example, a cross may be used as a marker on one lens, a circle on another lens, and a triangle on a third lens. In this way, the type of the marker (e.g., as detected in an image) can be used to associate the marker with a lens.

Since the original relative position and alignment of the camera and the lens is known, once the lens or camera is moved, by using the estimated position of the marker, we can "reconstruct" the new relative position and alignment of the camera and the lens. Accordingly, the eye tracking camera and illuminators will be recalibrated automatically and immediately.

Different approaches can be used to trigger the calibration. In one approach, the calibration is always ON during the lifetime of the headset, as long as the headset is powered on or when a user's eyes are detected by the eye tracking camera. In another approach, a sensor can be used to trigger calibration. For instance, an accelerometer and/or gyroscope is used for sudden movement detection and then trigger the calibration process. In yet another approach, the user may use a manual control (e.g. physical button on the VR headset) to initiate the recalibration process. In some or all approaches, a warning feedback (audible or visible or vibration) would be given upon the imperfect eye tracking situation (e.g. in response to the sensor trigger). In a further example, the trigger is a detection of a user presence (or lack thereof). For example, the calibration may be performed upon detecting user presence after not having seen the user for a predefined period of time, such as for 20 seconds.

Prior to the execution of the hardware calibration or runtime of the eye tracking headset, the (factory default) information or data of the position and alignment of each component inside the eye tracking headset is stored in a computer readable medium and it is known or inputted into the system. The components include at least hot mirrors 560, illumination module (530+540), camera module 550, lens cup 510, and VR display 570. The position and alignment data of the components are represented by a 3D coordinate system.

In an embodiment, an augmented reality, virtual reality, or other wearable apparatus is provided. The wearable computing devices of FIGS. 4-5 are an example of such apparatus. In an example, the apparatus includes an eye tracking device and one or more processors. The eye tracking device includes an image sensor, such as a camera, and a first lens. The first lens includes a first marker. For instance, the first marker is on a surface of the first lens or embedded in the first lens. The position of the first marker is within the field of view or field of vision (FOV) of the camera. The first marker is selected from a group consisting of: a cross mark, a dot pattern, a dot, a line, and a geometric shape. Additionally or alternatively, the first marker includes a lighted element (e.g., one or more LEDs). The apparatus or the eye tracking device further includes a second lens including a second marker. The second marker is located at one layer of the lens. Additionally or alternatively, the apparatus further includes a hot mirror including another marker.

The one or more processors are configured (e.g., based on computer-readable instructions stored in one or more non-transitory computer-readable storage media) to at least receive a first image from the image sensor, where the first image shows the first marker; determine a first distance from the image sensor to the first marker based on the first image; and change at least one calibration parameter of an eye tracking algorithm used with the eye tracking device based on the first distance.

In an example, changing the at least one calibration parameter is further based on the first distance being different than a second distance, where the second distance is a previously measured and stored distance. In an example, changing the at least one calibration parameter based on the first distance includes determining another distance from the image sensor to the first lens based on the first distance and a known location of the first marker at the first lens, and changing the at least one calibration parameter of the eye tracking algorithm used with the eye tracking device based on the second distance. The one or more processors can be further configured to determine a direction of the image sensor relative to the first marker based on the first image. If so, changing the at least one calibration parameter is further based on the direction.

In a further example, the change of calibration parameters is executed in an event (a) the newly determined distance is different from the previous determined value; and (b) the adjustment of calibration parameters is not just based on the newly determined and different distance value but also based on the input position and alignment data of the components.

In an example, if a second marker is included in a second lens, the first image shows the second marker. The one or more processors are further configured to determine a second distance from the image sensor to the second marker based on the first image; and change at least one calibration parameter of the eye tracking algorithm based on the second distance. In another example, if a second marker is included in a second lens, the one or more processors are further configured to receive a second image from the image sensor, where the second image shows the second marker; determine a second distance from the image sensor to the second marker based on the second image; and change at least one calibration parameter of the eye tracking algorithm based on the second distance. In yet another example, if a second marker is included in a hot mirror, the first image, or a second image received from the image sensor, shows the second marker. The one or more processors are further configured to determine a second distance from the image sensor to the second marker based on the first image or the second image; and change at least one calibration parameter of the eye tracking algorithm used with the eye tracking device based on the second distance. In these various examples, the at least one calibration parameter is selected from a group consisting of an imagine parameter, a focal length, a distortion parameter, and an illumination parameter.

Figure 6:
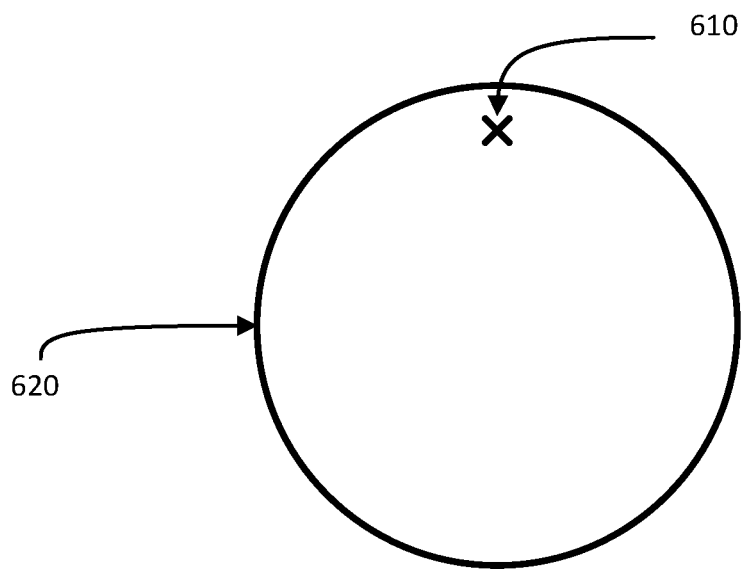
FIG. 6 shows an example of a marker on a lens.
Figure 7:
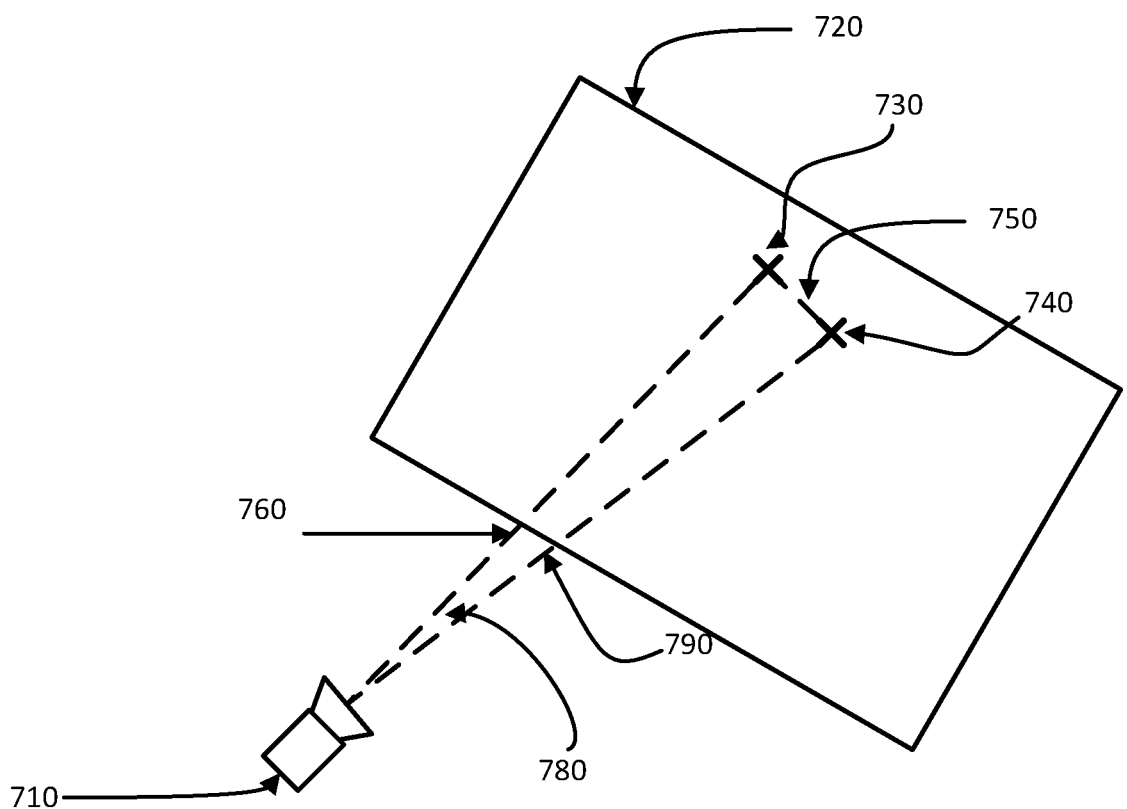
FIG. 7 shows an example use of markers on a lens.
Figure 8:
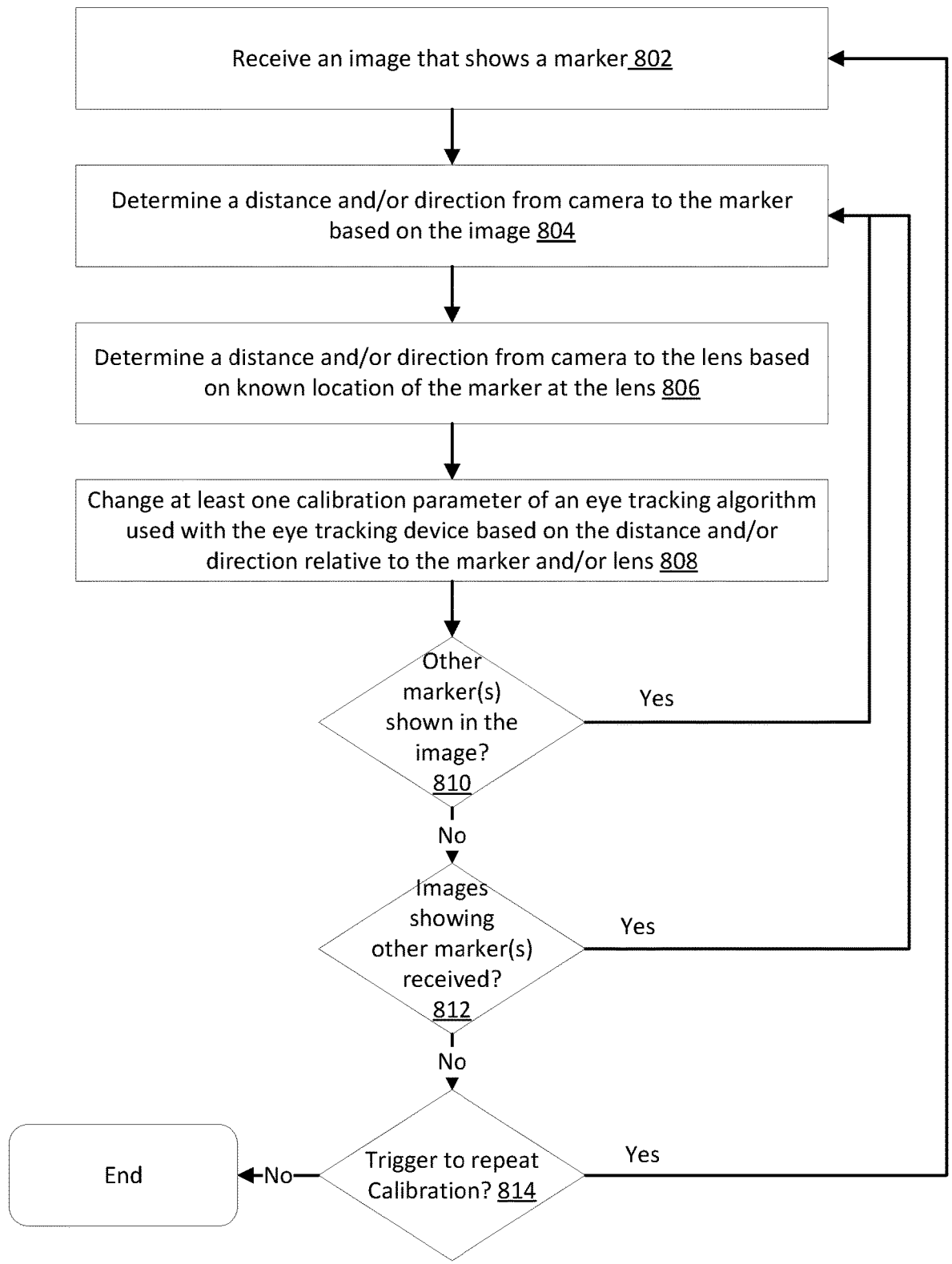
FIG. 8 shows a method for updating a calibration parameter.

These and other features are further described in connection with FIGS. 6-8. FIG. 6 illustrates an example of a marker on or in a lens. FIG. 7 illustrates an example of an image of the marker and the computation of a distance and a direction based on the image. FIG. 8 illustrates an example of a flow for updating a calibration parameter.

FIG. 6 illustrates an example of a marker 610 on or in a lens 620, according to certain embodiments of the present disclosure. As illustrated, the lens 620 can have a geometric shape (e.g., a circle, and ellipse) and have dimensions to fit in a wearable computing device, such as a VR headset or AR headset. For example, the lens 620 is a Fresnel lens.

The marker 610 can be attached (e.g., glued) or embedded (e.g., etched, or textured) on an exterior surface of the lens 620 or can be embedded within an interior volume of the lens 620. In an example, the marker 610 can have a shape such as a cross mark, a dot pattern, a dot, a line, a geometric shape, and/or can include a lighted element (e.g., an illumination matrix that includes a plurality of LEDs that are arranged in a predefined pattern on the lens or embedded in the lens). The shape and/or any pattern conveyed by the shape and/or the lighted element can encode or present information about the marker 610. This information can be used to compute the distance and direction. For example, the information can indicate the size of the marker 610 (which allows to establish a pixel scale based on an image analysis and the pixel scale is usable in the computation as further described in connection with FIGS. 7-8). Further, the information can indicate the original location of the marker 610 on or in the lens 620 (e.g., top of the lens, within five millimeters from the outer perimeter of the lens 620), which can also be used in the computation. The information can also identify the marker 610 or the lens 620 (which is usable to retrieve relevant information from memory about the size, location, and or previous distances and directions).

Different techniques are possible to adjust one or more calibration parameters based on the position and alignment of components of a wearable computing device (e.g., a lens and an image sensor). Generally, existing position and alignment data of the components is available from memory. An image is captured by the image sensor and shows a marker on the lens. The distance between the marker and the lens is computed based on the image. The calibration parameter(s) is adjusted based on the existing position and alignment data of the internal components and on the computed distance.

Different techniques are available to compute the relative movement between the components of the wearable computing device based on image data. In an example, the position and alignment data of each component is mapped into a three dimensional coordinate system. This system also includes the location of a marker. The relative distance and position of the components is known to the system first or stored based on the previously determined results. Once the image sensor detects the movement of the marker, the movement can be computed based on the information from the image and the information available from the three dimensional coordinate system. Since all the relative positions and alignments are mapped on the same three dimensional coordinate system, the new relative position and alignment of each of the components can be automatically computed by re-mapping the components to the three dimensional coordinate system based on image data generated by the image sensor. The difference between the new mapping and the previous mapping indicates the new relative position and alignment, which are the used to change the calibration parameter(s).

FIG. 7 illustrates an example of an image of a marker and the computation of a distance and a direction based on the image, according to certain embodiments of the present disclosure. In an example, the distance is a straight distance between the marker (e.g., a point on a surface of the marker) and a camera 710 (or a point on a surface of the an image sensor of the camera 710). This straight distance indicates the position of the camera 710 and lens (e.g., a value representing a distance separation between the two). The direction is the direction of movement of the marker from a previous location. This direction indicates a rotation of the lens relative to the camera 710 (or vice versa). The determination of the marker movement is not limited to the aforementioned direction calculation. The cause of such movement may vary due to different manufacture methods of the components.

The number of images used to derive the distance and direction can depend on the information conveyed by the marker and/or the relevant information available from memory. In an example, a single image suffices when the marker encodes or presents its size and original location. Similarly, a single image suffices when the marker identifies itself or the lens and information about the size and original location are available from the memory based on the identifier. In these examples, the single image shows the marker in its current location based on the movement of the camera 710 and/or the lens. Otherwise, two or more images may be used. One of these images shows the previous location, where the previous location corresponds to a previous distance available from the memory. One of the other images shows the current location, for which the distance and direction should be computed. The difference between the previous location and the current location indicates the direction. The use of a single image is described in more detail herein next, followed by a description of using two images.

Generally, the distance and direction can be defined relative to a coordinate system (e.g., one centered at the center of the image sensor of the camera 710) and can be expressed as a vector (the distance being the vector's magnitude and the direction being the vector's direction). A location of the camera (as determined from the image(s)) is mapped to coordinates in the coordinate system. Further, in the coordinate system, the vector can start at the camera 710 and end at the coordinates of the marker. Geometric reconstruction is applied to compute the vector's direction and magnitude based on the image(s).

With a single image, the image shows the marker in its current location. The size of the marker can be identified, directly from the encoded information in the image or indirectly from the relevant information stored in the memory. The size is compared to the number of pixels that the marker occupies in the image. The comparison establishes a pixel scale (e.g., if the marker is ten millimeters wide and occupies ten pixels in the image, then each pixel in the image corresponds to one millimeter).

Thereafter, the distance and direction are computed based on a geometric reconstruction that uses the pixel scale. For instance, a right triangle is formed between the camera 710 and the current location of the marker in the image (the hypotenuse is the location of the camera 710 to the current location), and between the current location and an edge of the image (e.g., a cathetus). The interior angles and the cathetus are determined from the image based on the pixel scale. The hypotenuse (e.g., the distance) is computed using a trigonometric operation.

To compute the direction from the single image, the current location of marker in the image is determined and the original location is directly accessed (e.g., from the encoded information shown in the image) or indirectly accessed (e.g., from the relevant information in the memory). The two locations are compared and the pixel scale is applied to the difference between the two locations to derive the direction.

With the use of two or more images, one or more previous locations of the marker in one or more previous images are compared to the current location of the marker in the current image. A previous location corresponds to a previous known direction and location. The difference with the current location can be used to generate a difference vector. A pixel scale can be computed as above or from the previous location and the previous distance. The pixel scale is applied to the different vector. The magnitude and direction of the difference vector represents the direction of the marker. Geometric reconstruction is applied to derive the direction from the previous direction and the difference vector.

The use of two images is further illustrated in FIG. 7. The difference between the two images is shown as a difference image 720. The marker moves from a previous location 730 (as would be shown in the previous image) to its current location 740 (as would be shown in the current image). The difference between the two establishes a difference vector 750. Because the previous distance 760 between the previous location 730 and the camera 710 is known, a pixel scale can be derived and applied to the difference vector 750 to compute its magnitude. The magnitude and direction indicate the movement of the marker to the new location 740. Geometric reconstruction is then applied to compute a rotational angle 780 and the new distance 790 between the marker at the current location 740 to the camera 710.

Of course, the marker may not have moved. Instead the camera 710 may have moved and a similar approach (a single or multiple images) can be used. Likewise, if both components moved, a similar approach can also still be used.

FIG. 8 illustrates an example of a flow for updating a calibration parameter, according to certain embodiments of the present disclosure. The flow starts at operation 802, where an image is received by a computer system (e.g., the electronic board 580 of FIG. 5). The image shows at least one marker. The marker is on or in a lens. The image is generated by a camera (e.g., captured by an image sensor of the camera).

At operation 804, the computer system determines a distance and/or direction from the camera (e.g., from the image sensor) to the marker based on the image. As described in connection with FIGS. 6-7, various approaches are possible. In one approach, a single image can suffice. In another approach, a history of the distance and/or location is accessed. That history can include previous images that show the marker at previous locations. Generally, geometric reconstruction is applied to measure the distance and the direction in both approaches.

At operation 806, the computer system determines a distance and/or direction from the camera (e.g., from the image sensor) to the lens based on a known location of the marker on the lens. For example, this distance and direction is from the center of the image sensor to the center of the lens. The known location of the marker identifies a vector between the center of the marker and the center of the lens. This vector is used to derive, from the distance and direction of operation 804, the distance and direction between the camera and the lens.

At operation 808, the computer system changes at least one calibration parameter of an eye tracking algorithm used with the eye tracking device based on the distance and/or direction relative to the marker and/or lens as computed at operations 804 and 806. In an example, changing a calibration parameter includes changing one or more of an imagine parameter, a focal length, a distortion parameter, and an illumination parameter. The change can be specified in a table stored in local memory of the computer system or remote memory accessible to the computer system over a data network. The table associates a value of the calibration parameter with a distance and/or direction between the camera and another component (e.g., a lens, a hot mirror, etc.). The values in the table can be derived during the design, development, and testing phase of the wearable computing device under a controlled laboratory environment or in a trial operational phase.

At operation 810, the computer system determines if other markers are available in the image. The presence of another marker can be based on an image analysis or on prior knowledge about the number of markers to expect. The other marker can be located on or in the same lens, on another lens, or on a hot mirror. If so, operation 804 is followed. In this way, additional distances and/or directions can be computed to update calibration parameters. More specifically, if the other marker is on the same lens, the accuracy of the distance and direction computations can be increased (e.g., by averaging the two vectors, one for each marker on the lens). If the other marker is on a different lens or a hot mirror, distance(s) and direction(s) from the camera thereto can be similarly computed and used to further update the relevant calibration parameter(s) as specified in the table. If no other markers are shown in the image, the flow moves to operation 812.

At operation 812, the computer system determines if other images showing other markers are available. If so, operation 804 is followed. In this way also, additional distances and/or directions can be computed to update calibration parameters. Otherwise, the flow moves to operation 814.

At operation 814, the computer system determines if a trigger to repeat the calibration exists. Various types of triggers are possible. In one example type, the calibration is repeated if the wearable computing device is powered on or when a user's eyes are detected by its eye tracking system. In another example type, a sensor can be used to trigger calibration. For instance, an accelerometer or gyroscope is used for sudden movement detection and then trigger the calibration process. In yet another example type, the user may use a manual control (e.g. physical button on the VR headset) to initiate the recalibration process. If the trigger is received, the flow loops back to operation 802 (e.g., operation 802 starts and is repeated based on the triggers). Otherwise, the flow ends.

The distance determination is not limited by using a camera-based sensing system. A camera-less sensing system is also possible, for example, a specific type of Micro-Electro-Mechanical Systems (or MEMS) can also be implemented to achieve similar results.

Hardware Calibration Based on Distortion Compensation

Generally, a lens in a wearable computing device, such as the ones illustrated in FIGS. 4-5, suffers from pincushion distortion. This distortion strongly affects the eye image capture directly and affects the gaze tracking performance indirectly. Technically, due to the lens pincushion distortion, the captured eye image can have a lot distortion especially when the eye moves far away from the lens (relative to a threshold value).

In other cases, there might be other types of distortion, usually classified as barrel distortion and mustache distortion. The distortion can be irregular or follow many patterns. In VR implementation, mostly the common distortions are radially symmetric. However, this depends on relative placement and alignment between the camera and lens, the eye image may also suffer non-symmetric distortion. In summary, any type of geometric distortion is possible and strongly affected by the lens design. And the distortion correction model adapts to various kind of distortions.

A distortion compensation model is needed to correct captured eye images for gaze tracking. This distortion correction model is dependent on the cornea center-to-lens center distance (shown as $D_0$ in FIGS. 9 and 10). This means that the distortion model should be adapted to the cornea-to-lens distance at each frame to compensate the eye images for gaze tracking. Further, the distortion model to be used can depend on the distance to the eye and the position of the eye in x and y coordinates relative to the lens and the display.

Figure 9:
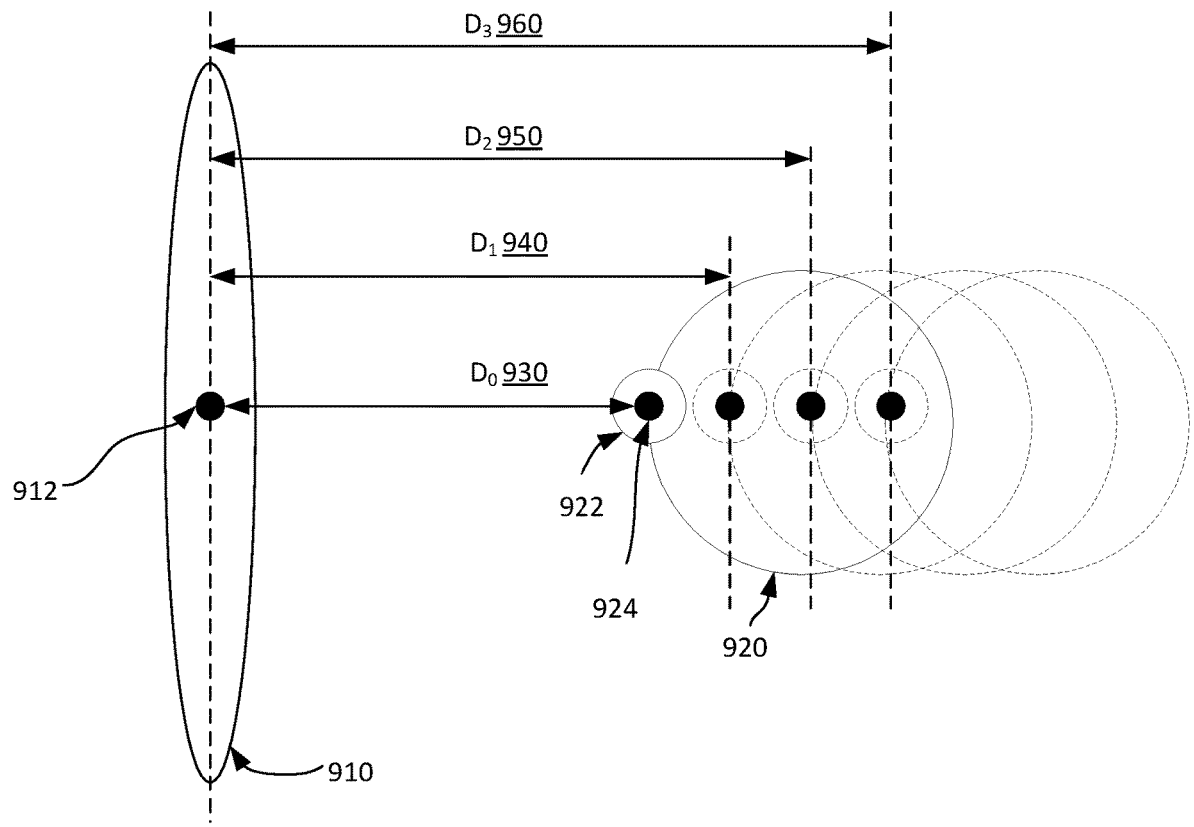
FIG. 9 shows examples of cornea center-to-lens distances.
Figure 10:
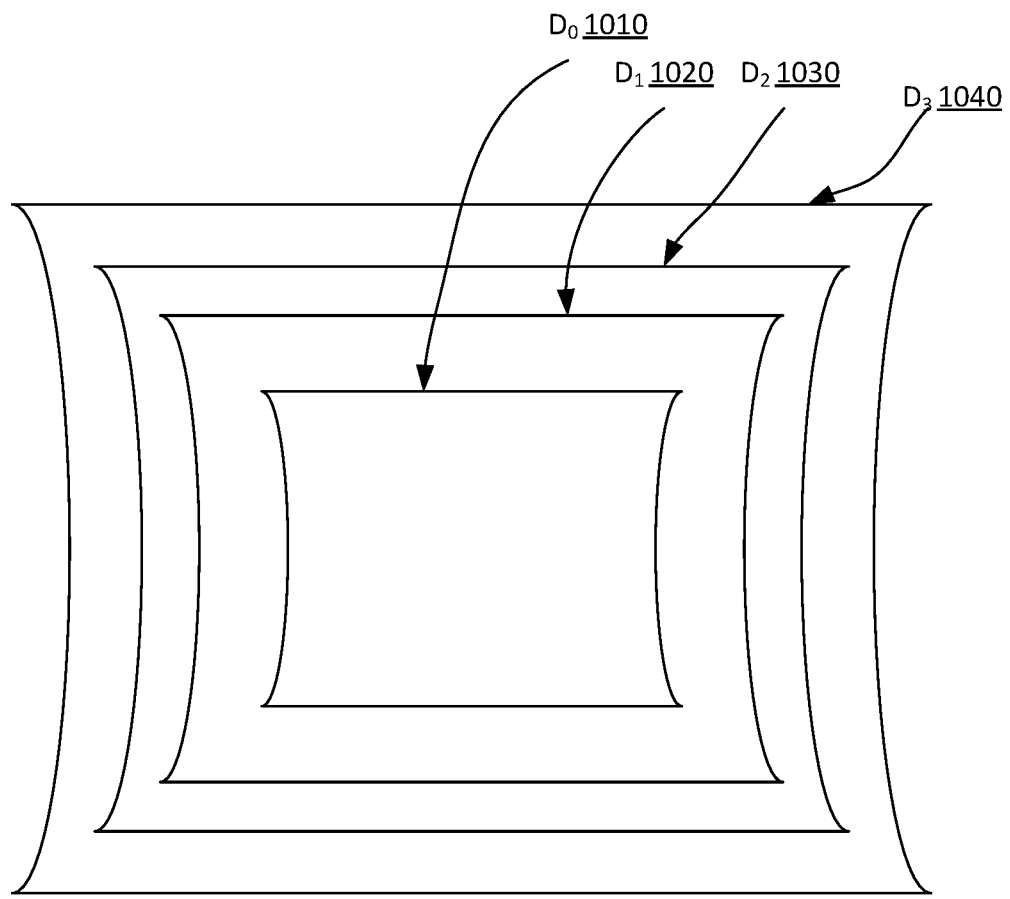
FIG. 10 shows an example of image pincushion distortion.

Hence, an updated cornea center-to-lens center value (estimated from each frame) is fed into the distortion correction model. To do so, a nominal (default) value is set (based on statistical average value) for the cornea center-to-lens center. The distortion correction model is setup based on the default cornea center-to-lens center. During eye tracking, a cornea center-to-lens center (such as distances $D_1$, $D_2$, $D_3$ as shown in FIGS. 9-10) value is estimated at some rate, such as based on each eye image or alternative frame or based on a trigger (image capture operation may be manually adjusted by the user or automatically according to the headset movement, e.g. whether the user frequently moves the headset, movement is detected by eye image capture and onboard accelerometer and gyroscope). The cornea center-to-lens center is estimated an updated. The newly estimated and updated cornea center-to-lens center is used to setup a new/updated distortion correction model. And the process loops back between setting-up the distortion correction model and using the new estimates to update this model.

If the cornea center-to-lens center distance changed, as shown in FIGS. 9-10, the distance varies, and original distance (e.g., $D_0$) is assumed to be the optimal distance. Generally, the longer the distance (e.g., as $D_3$), the more pincushion distortion exists.

In an embodiment, an augmented reality, virtual reality, or other wearable apparatus is provided. The wearable computing devices of FIGS. 4-5 are examples of such an apparatus. In an example, the apparatus includes an eye tracking device and one or more processors. The one or more processors are configured (e.g., based on computer-readable instructions stored in one or more non-transitory computer-readable storage media) to at least receive image data from the image sensor, where the image data corresponds to an image as observed through the lens; determine a level or a pattern of pincushion distortion in the image based on the image data; and change at least one calibration parameter of an eye tracking algorithm used with the eye tracking device based on the level or the pattern of pincushion distortion.

In an example, changing the at least one calibration parameter based on the level or the pattern of pincushion distortion includes determining a relative position or relative direction of the image sensor based on a level or a pattern of pincushion distortion, and changing the at least one calibration parameter of the eye tracking algorithm used with the eye tracking device based on the relative position or the relative direction of the image sensor.

In an example, the apparatus further includes a motion sensor. The at least one processor is further configured to receive a signal from the motion sensor; determine, based on the signal, that the apparatus has accelerated or decelerated beyond a threshold amount; and initiate at least one action in response to determining that the apparatus has accelerated or decelerated beyond the threshold amount. The at least one action includes at least one selection from a group consisting of alerting a user of the apparatus, and changing at least one calibration parameter of the eye tracking algorithm.

Figure 11:
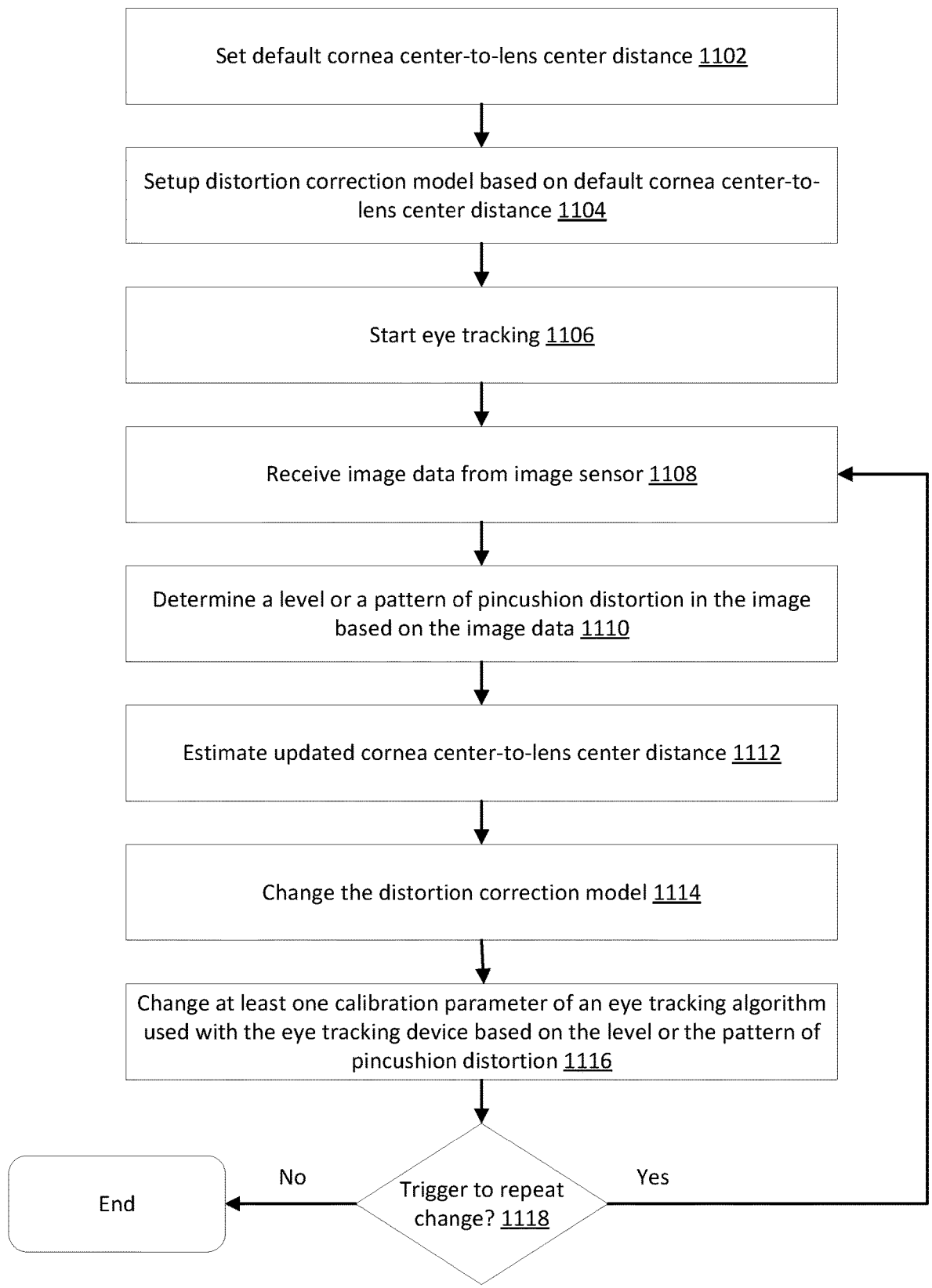
FIG. 11 shows another method for updating a calibration parameter.

These and other features are further described in connection with FIGS. 9-11. FIG. 9 illustrates examples of cornea center-to-lens center distances. FIG. 10 illustrates an example of an image of the example of the pincushion distortion. FIG. 11 illustrates an example of a flow for updating a calibration parameter based on an image of an eye, where the image suffers from the pincushion distortion.

FIG. 9 illustrates examples of cornea center-to-lens center distances, according to certain embodiments of the present disclosure. Although FIG. 9 illustrates four distances, shown as $D_0, \ldots, D_3$, any number of distances is possible depending on the level or pattern of the pincushion distortion and can be generally referred to as $D_i$, where "i" is a positive integer. A cornea center represents a center of a cornea. The cornea center is determined in three-dimensional space. There are several parameters needed to be considered for determining the cornea center, that includes the position of the camera and the position at least two illuminators, at least two glint positions (caused by at least two different illuminators) on the spherical region of the cornea and cornea radius. A lens center represents a center of a lens. A cornea center-to-lens center distance represents a distance between a center of a cornea and a center of a lens.

As illustrated, a lens 910 is installed in a wearable computing device (not shown). A nominal value for a distance between the center 912 of the lens and the center 922 of a cornea of a human eye ball 920 of a user is defined as distance $D_0$ 930. This nominal value represents a default cornea center-to-lens center distance and when the wearable computing device is mounted on the user's head and is defined based on statistical average value across different users wearing this device (either by using data modeling and/or actual data).

When the eye moves away from this default distance, the level and/or pattern of distortion can change. The movement can be caused for different reasons, including changes to the location of the lens 910 in the wearable computing device (e.g., either intentionally based on a user adjustment, or unintentionally because of the general movement and, sometimes, sudden drops of the wearable computing device by the user).

As the eye 920 moves further away from the center 912 of the lens, the level and/or pattern of the pincushion distortion changes. The level indicates the amount of distortion that would exist in an image of the eye 920, where this image is used for the eye tracking. The pattern indicates how the distortion appears in the image.

Hence, at a distance $D_1$ 940, which represents another value for the cornea center-to-lens center, the level and pattern of the pincushion distortion is different from the one at the distance $D_0$ 930. Likewise, at a distance $D_2$ 950, which represents another value for the cornea center-to-lens center, the level and pattern of the pincushion distortion is different from the ones at the distances $D_0$ 930 and $D_1$ 940. Similarly, at a distance $D_3$ 960, which represents another value for the cornea center-to-lens center, the level and pattern of the pincushion distortion is different from the ones at the distances $D_0$ 930, $D_1$ 940, $D_2$ 950. Each of these distances $D_1$ 940, and $D_2$ 950, and $D_3$ 960 represent a change to the default distance $D_0$ 930. The larger the distance, the more distortion exists (e.g., the amount of the distortion increases and the pattern becomes more pronounced).

FIG. 10 illustrates an example of an image of an example of a pincushion distortion, according to certain embodiments. Like in FIG. 9, here the pincushion distortion is illustrated in connection with four distances $D_0, \ldots, D_3$ (that correspond to the distances in FIG. 9). However, any number of distances is possible depending on the level or pattern of the pincushion distortion and can be generally referred to as $D_i$, where "i" is a positive integer. Although not shown in FIG. 10, the illustrated distortion is that of an image of an eye of a user wearing a wearable computing device. And this image is used for eye tracking.

As illustrated, the pincushion pattern changes with the distance $D_i$. The larger the distance $D_i$, the larger the amount (e.g., level) of distortion, resulting in a different pattern. The pattern of the distortion is illustrated with a particular shape, such as a distorted rectangle (e.g., the vertical sides of the triangle are convex lines instead of straight lines). The level of distortion is illustrated by the size, area, and/or perimeter of the particular shape.

Hence, at a distance $D_0$ 1010, which represents a default value for the cornea center-to-lens center, a default distortion is identifiable from an eye image (shown as the distorted rectangle at the center). At a distance $D_1$ 1020, which represents another value for the cornea center-to-lens center, the level and/or pattern of the distortion changes from the one at the distance $D_0$ 1010 (the change is shown with a larger distorted rectangle). Likewise, at a distance $D_2$ 1030, which represents another value for the cornea center-to-lens center, the level and/or pattern of the distortion changes from the ones at the distances $D_0$ 1010 and $D_1$ 1020 (the change is shown with an even larger distorted rectangle). Similarly, at a distance $D_3$ 1040, which represents another value for the cornea center-to-lens center, the level and/or pattern of the distortion changes from the ones at the distances $D_0$ 1010, $D_1$ 1020, and $D_2$ 1030 (the change is shown with a the largest distorted rectangle).

FIG. 11 illustrates an example of a flow for updating a calibration parameter based on an image of an eye, where the image suffers from a pincushion distortion, according to certain embodiments of the present disclosure. The flow starts at operation 1102, where a default cornea center-to-lens center distance is set by a computer system (e.g., the electronic board 580 of FIG. 5). This default value can be stored in local memory of the computer system and can represent an average cornea center-to-lens center distance.

At operation 1104, the computer system sets up a distortion correction model based on the default cornea center-to-lens center distance. For example, the computer system loads this model from the memory for use in the eye tracking. In an example, a predictive model is used and associates levels and/or patterns of pincushion distortion with values for one or more calibration parameters (e.g., a value for an imagine parameter, a focal length, a distortion parameter, and an illumination parameter, etc.). The associations can include, in the predictive model, a mapping between known images of potential pincushion distortions, the levels and/or patterns of the potential pincushion distortions, the cornea center-to-lens center distances, and the values of the calibration parameters. These known images can be stored in the predictive model itself, or separately in a local memory of the computer system or a remote memory accessible to the computer system over a network. The values can be derived during the design, development, and testing phase of the wearable computing device under a controlled laboratory environment or in a trial operational phase. Setting up the distortion correction model includes, for instance, accessing, from the predictive model, the values that correspond to a pincushion distortion that should be observed at the default cornea center-to-lens center distance and specifying that these values should be used in the eye tracking to compensate for the distortion.

At operation 1106, the computer system starts the eye tracking. Different triggers are possible. In an example, the tracking starts in response to the wearable computing device being turned on, based on sensing that this device has been worn on the user's head, or based on a manual input of the user received at the wearable computing device. Generally, the eye tracking involves analysis of images of at least one eye of the user. Such eye images can suffer from the pincushion distortion depending on the cornea center-to-lens center distance.

At operation 1108, the computer system receives image data from an image sensor (e.g., a camera) of the wearable computing device. This image data represents an image of the user's eye and is received as part of the eye tracking.

At operation 1110, the computer system determines a level and/or a pattern of pincushion distortion in the image based on the image data. In an example, the computer system applies a pattern recognition or an image analysis algorithm to recognize the level and pattern. In another example, the computer system matches the image data to one of the known images available from the predictive model, the local memory, or the remote memory. For instance, a best match is identified, and the matched known image is used. That known image is associated with the level and pattern of the pincushion distortion in the predictive model.

At operation 1112, the computer system estimates an updated cornea center-to-lens center distance. In an example, this updated distance is derived from the pattern recognition or image analysis algorithm, if one is used at operation 1110. In another example, the updated distance is determined from the predictive model, where this model associates the level and pattern of the pincushion distortion with the updated cornea center-to-lens center distance. Generally, the distance indicates a relative position or relative direction of the image sensor based on the level or the pattern of the pincushion distortion.

At operation 1114, the computer system changes the distortion correction model. In an example, the computer system accesses the values of calibration parameters that are relevant to the updated cornea center-to-lens center distance (or, equivalently, the level and/or pattern of pincushion distortion) and updates the distortion correction model by specifying that these values should be used in connection with the eye tracking.

At operation 1116, the computer system changes at least one calibration parameter of an eye tracking algorithm used with the eye tracking device based on the level or the pattern of pincushion distortion. For example, the values for the relevant calibration parameters are changed as identified from the predictive model.

At operation 1118, the computer system determines whether a trigger exists to repeat the change. If so, the flow loops back to operation 1108. Otherwise, the flow ends. Various triggers are possible. In one example, the change is repeated automatically at a frame interval (e.g., for each received image or for every other image). In another example, the computer system receives a signal from a motion sensor of the wearable computing device. Based on the signal, the computer system determines that the wearable computing device was moved, and that the movement indicates that the wearable computing device has accelerated or decelerated beyond a threshold amount. The computer system then initiates at least one action in response to determining that the apparatus has accelerated or decelerated beyond the threshold amount. That action includes repeating the change and alerting the user. For instance, the alert is about the change and can be presented visually on a display and/or audibly on a speaker.
(or, on the pupil)

Optimized Fresnel Lens

Many wearable computing devices use Fresnel lenses. A typical configuration of a Fresnel lens is for a lens that has rings with a large and constant step size. The problem with these Fresnel steps is that they are clearly visible in the eye-tracking images (namely eye images) because they distort the image locally and they scatter light from the illuminators that can be interpreted as glints. Hence, the eye image is useless or difficult to use for gaze determination.

Embodiments of the present disclosure are directed to an optimized Fresnel lens that improves the eye tracking and the user experience. In an example, the Fresnel steps are smaller than a certain step size. In the center region of the Fresnel lens, any Fresnel step can be completely absent. By not having any Fresnel steps in the center region, stray light is minimized (thereby improving the user experience), the image quality is improved, and no false glints exist (thereby improving the eye tracking). Fresnel steps/rings gradually surround the clear center region with increasing groove depth and possibly increasing step size.

Hence, the Fresnel lens includes a central region that is flat with no gaps, and variable size Fresnel lens steps outside of the central region. Relevant to a small size for a Fresnel lens step, a step size/pitch of the Fresnel ring is smaller than the pixel size of the camera pixels (or if binning is used the size of the combined pixels) divided by the focal length of the camera times the optical distance between the camera and the lens times two. A Fresnel ring pitch much smaller than this value may generate unnecessary stray light. Outside of the central flat region, the groove depth of the Fresnel lens gradually increases and possibly the step size increases.

Further, a two layer (or multi layer) Fresnel lens configuration is possible. Each layer has different lens step and size. The size of the central flat region can also be different.

In addition, stray light can be reduced by introducing anti reflection (AR) techniques. Standard anti reflection coatings necessitate complex coating processes that are expensive and may not scale well with high production volumes. Other techniques like Motheye-structure (ME) or plasmaAR® can be more suitable. The resulting surfaces are sensitive to contaminations so they should not be used on the surface facing the user but can be used on all other surfaces. Even on the Fresnel surfaces these AR techniques can be used.

Figure 12:
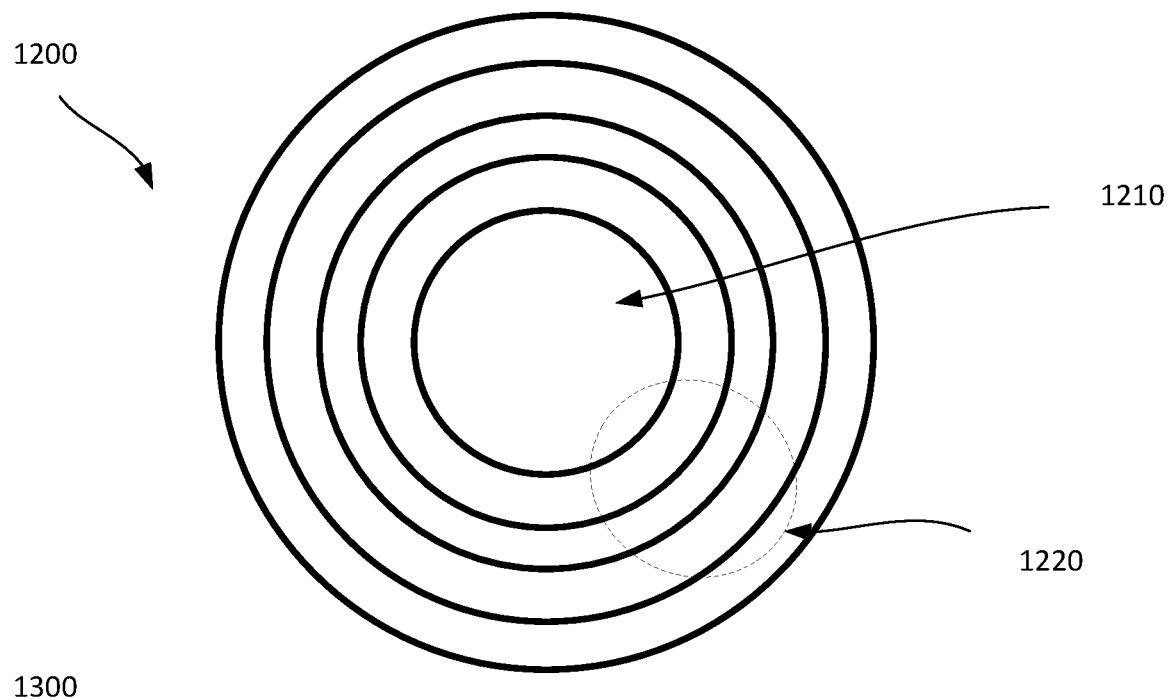
FIG. 12 shows an example of an optimized Fresnel lens.

FIG. 12 illustrates an example of an optimized Fresnel lens 1200, according to embodiments of the present disclosure. As illustrated, the Fresnel lens 1200 includes a central (or center) region 1210 and Fresnel rings 1220 that surround the central region 1210. The central region 1210 is clear of any of such rings and is optically clear such that light can pass through that region. Different shapes and sizes of the of the central region 1210 are possible depending on the shape and size of the Fresnel lens 1200 and its placement relative to other components (e.g., the camera, the area for receiving the user's eye, etc.) in a wearable computing device. In an example, the Fresnel lens 1210 has a circular cross section with a diameter in the range of ten to fifty millimeter. The central region 1210 is also circular and has a diameter in the range of 1% to 25% of the diameter of the Fresnel lens 1200.

In an example, the Fresnel rings 1220 include a number of rings that annularly surround the central region 1210. The number and sizes of these rings 1220 depend on the shapes and sizes of the Fresnel lens 1200 and/or central region 1210. Generally, each of the Fresnel rings 1220 have a groove depth and a step size. The groove depth and/or the step size increases with an increase to the diameter of a Fresnel ring 1220. The groove depth can be in the micrometer range. The step size can be in the millimeter range.

Figure 13:
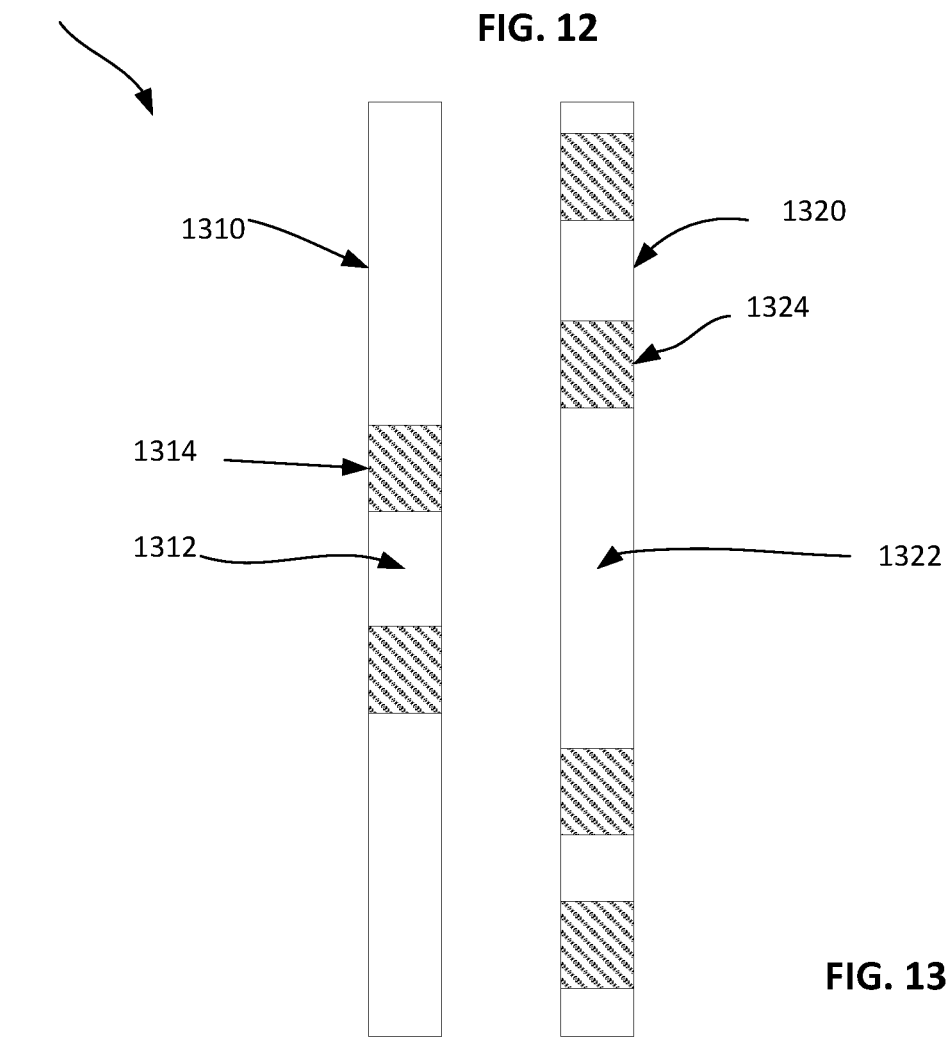
FIG. 13 shows an example of a two-layer Fresnel lens.

FIG. 13 illustrates an example of a two-layer Fresnel lens 1300, according to embodiments of the present disclosure. A first layer 1310 includes a central region 1312 and a number of Fresnel rings 1314 around the central region 1312. Similarly, a second layer 1320 includes a central region 1324 and a number of Fresnel rings 1324 around the central region 1322. Generally, these central regions 1814 and 1824 are aligned and their center can, but need not be, on the same axis (a horizontal axis goes through their centers). As illustrated, the size of the central regions 1312 and 1324 is different. The size of the Fresnel rings 1314 and 1324 can also be different.

Virtual Environment Control

FIGS. 14-21 illustrate different examples for manipulating virtual objects in a virtual environment. In the interest of brevity, a virtual object is referred to herein as an "object." Generally, objects can be represented in different layers of the virtual environment. Each object has a set of parameters that control how the object is presented (referred to herein as presentation parameters) and manipulation operations applicable to the object (referred to herein as manipulation parameters).

An external controller is presented in the virtual environment as a virtual controller. Also in the interest of brevity, a virtual controller is referred to herein as a "controller" (whereas an external controller is a physical controller). The external controller may have one or more touch areas, such as a touch-sensitive surface, a tactile button, a key switch, etc. These touch areas can be presented as virtual menus (referred to herein as "menus" in the virtual environment).

Placing a menu in the virtual reality or augmented reality environment can be important for user experience. Especially in a complex virtual context, having the menu placed in an appropriate position/alignment makes the user's operation much more natural and intuitive. In the present disclosure, the combination of gaze-based interaction with an object and controls from the external controller are used to trigger, place and operate the menu.

In an example, the gaze of the user in the virtual environment is tracked. If the user gazes at an object for a period of time longer than a time threshold, the object is selected. The selection can lock the object such that the user can look or gaze away from the object, while the object would still be selected and available for manipulation. Thereafter, and depending on the user's hold of a touch area on the external controller, a menu specific to that touch area is presented in the virtual environment. The menu provides options to manipulate the object according to the parameters of the object. The user operates the touch area on the external controller to go through and select available menu options and manipulate the object in the virtual environment.

In an example, presentation parameters of an object indicate the virtual environment layer that the object should be presented in and the look and feel of the object. Manipulation parameters of the object indicate the editable visual properties (e.g., the size, shape, color), constraints on moving and placing the object in the virtual environment (e.g., can the object be placed adjacent to another object), and associations with other objects. The menu corresponding to a touch area allows edits and manipulations of the object as set in its presentation and manipulation parameters.

Different types of associations can be defined. These associations impact how one object can be manipulated in light of other objects in the virtual environment and, thus, can control how the external controller is usable to manipulate these objects. A "relationship association" is an example and specifies how two objects are related. For instance, a parent-child association is described in connection with FIG. 16. In that figure, a 3D printer is associated with a printed object, where the printer is a parent and the printed object is a child. In this case, the 3D printer can be manipulated to create the printed object. Another example of associations is a "manipulation association" that specifies whether a manipulation of an object should carry from or to another object and how such two objects can be manipulated together. For example, a tree is described in connection with FIG. 14. The manipulation of that tree is independent of other objects in the environment based on its manipulation association indicating that the tree is not associated with other objects. In comparison, a card game is illustrated in connection with FIG. 18. In that figure, a card is associated with slots on a table for receiving the card. The manipulation of the card can be carried over to a slot such that the card can be placed in the slot.

Figure 14:
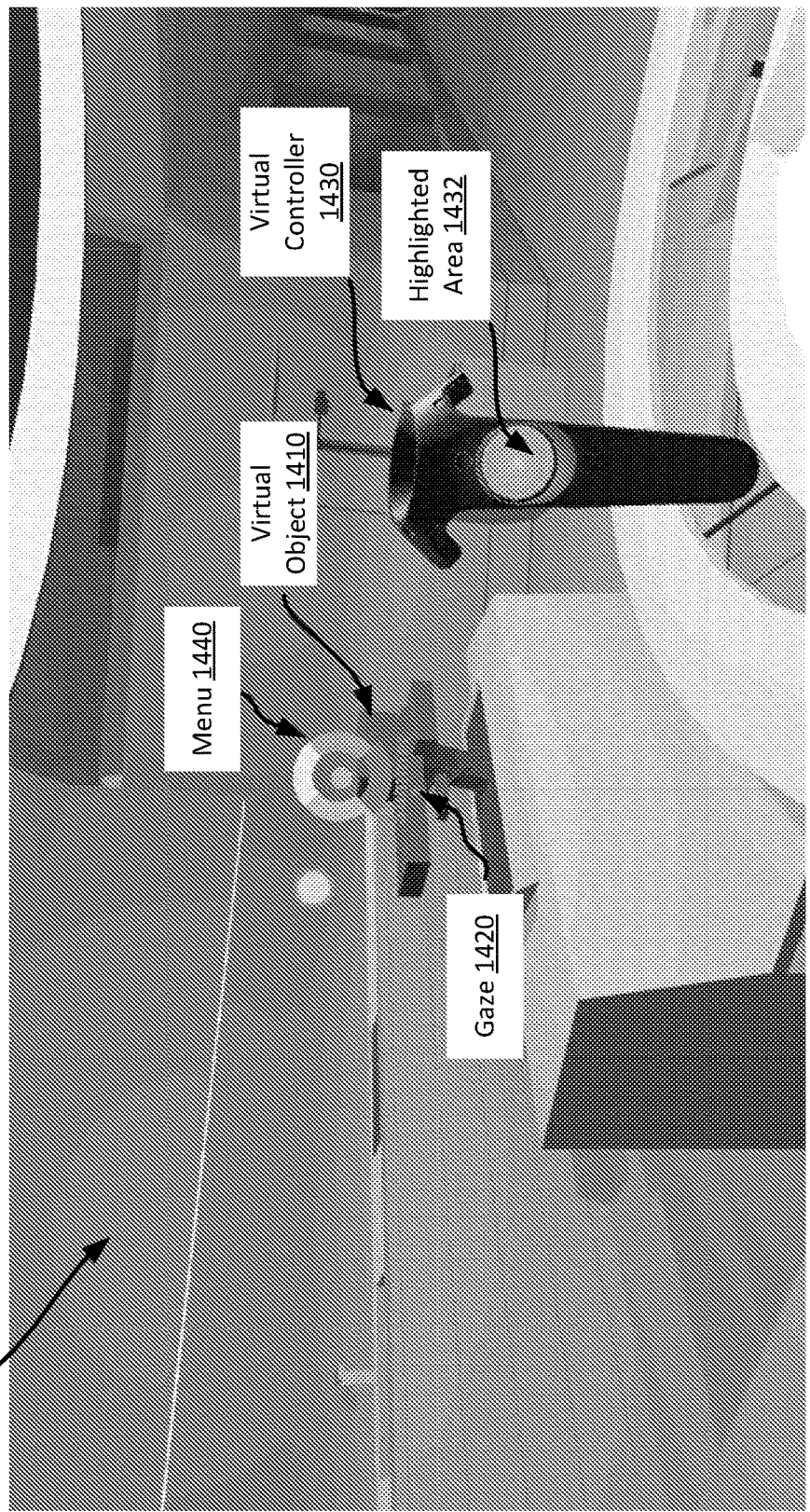
FIG. 14 shows an example of manipulating an object in a virtual reality environment.

FIG. 14 illustrates an example of manipulating an object 1410 in a virtual environment 1400, according to embodiments of the present disclosure. A wearable computing device, such as a VR or AR headset as illustrated in FIGS. 4-5, presents the virtual environment 1400. The wearable computing device is communicatively coupled with an external controller over a data network. The external controller can include a number of touch areas, each of which provide controls. The data network can be a wired or wireless network, including a local area network, a point-to-point network, a communication bus, or any other data networks suitable for exchanging control information between the external controller and the wearable computing device. The virtual environment 1400 can be a virtual reality environment in the case of a VR headset, or an augmented reality environment in the case of an AR headset.

As illustrated, the virtual environment 1400 presents an object 1410. This object 1410 has a set of parameters that makes it interactive. In particular, the user can interact with the object 1410 in the virtual environment, where an interaction involves manipulation the object 1410 by changing one or more of its properties. The object 1410 is shown as a three dimensional tree.

The wearable computing device presents the virtual environment 1400 on a set of displays and tracks the gaze of the user as he or she views the set of displays and gazes on the displayed virtual environment 1400. In an example, based on the tracking and a mapping between the set of displays and the virtual environment 1400, the wearable computing device presents an indication 1420 of the user's gaze position in the virtual environment. For example, the indication 1420 is presented as a geometric shape (e.g., a colored circle) in a layer of the virtual environment 1400. In another example, the gaze indication 1420 may be invisible to the user or may not be displayed. In reality, during such gaze based interaction, the user already knows what he or she is gazing at. As such, there may not be a need to present the indication 1420.

Further, as the user moves the external controller, the wearable computing device detects the movement based on the data communication with the external controller over the data network and displays a virtual controller 1430 in the virtual environment 1400. This controller 1430 can have the appearance (relative shape and size) to mimic the external controller.

If the user holds or is in contact with a touch area of the physical controller, the computing device gets an indication of such a "physical integration" in the physical environment from the external controller and updates the controller 1430 to highlight the corresponding virtual touch area 1432. As illustrated in FIG. 14, when the user interacts with a physical touch-sensitive area on the external controller, the corresponding area 1432 is highlighted on the controller 1430 in the virtual environment.

If the wearable computing device detects the user's gaze on the object 1410 (e.g., the three dimensional tree) for a predefined period of time, the wearable computing device may lock the gaze to the object 1410. After that, the user can gaze away from the object 1410 and still control the object 1410 via the external controller.

Other techniques to lock the object 1410 are possible. For example, a gaze region around the object 1410 is predefined. If the wearable computing device detects that the user's gaze is within this region and that, in parallel, receives an indication from the external controller of a user operation, the wearable computing device locks the object 1410. The gaze region can be predefined based on the parameters of the object. For example, the gaze region is a geometric area that wraps around the object 1410 and, thus, is generally bigger than the size of the object 1410.

Once the object 1410 is locked, the wearable computing device presents a menu 1440 in the virtual environment. In the example illustration of FIG. 14, the menu 1440 is positioned in proximity (e.g., adjacent to) to the object 1410, such that the user can be looking at both the object 1410 and menu 1440 while the object 1410 is being manipulated. This menu 1440 is in a different layer than that of the object 1410 in the virtual environment (as shown in FIG. 14, the menu is in a top layer and includes in part the object 1810). However, both elements 1410 and 1440 can alternatively be in the same layer.

In an example, the menu 1440 itself is in a way a virtual object and has a set of parameters that control how the look and feel of the menu 1440 and the manipulation operations that the menu 1440 supports. The wearable computing device sets these parameters according to the touch area on the external controller that the user is interacting with (rather than on the external controller itself). For instance, if the physical touch area is a circular touch-sensitive area that enables rotary operations, the menu 1440 is set as a circular menu that also enables rotary operations. If the physical touch area is a tactile button or a key switch, the menu 1440 is set as a virtual power switch.

In certain examples, the look and feel of the menu 1440 may match the physical touch area. For example, a circular menu 1440 is presented while the physical touch area is a button or switch like controller. Nonetheless, the menu 1440 is still usable to provide the rotary operations but such operations would necessitate different operations in the physical environment than merely clicking on the button/switch. For example, the user may move the external controller in a circular manner in the physical environment. The wearable computing device may receive information about this movement from the external controller and use this information to reflect the exerted controls on the object 1410 via the menu 1440.

Once the menu 1440 is presented, the user can operate the corresponding touch area (or, the whole controller in case of mismatch as explained in the previous paragraph) to manipulate the object 1410 according to the parameters of the object 1410 and the supported functionality by the menu 1440 (or, similarly, the physical touch area/controller). For example, the user can edit the color, shape, size, location, animation, etc. of the object 1410 in the virtual environment. As such, the wearable computing device receives the relevant control information from the external controller, updates the presentation of the menu 1440 to show that the corresponding controls are being applied, and updates the object 1410 and its presentation to show the changes to the object 1410.

Figure 15:
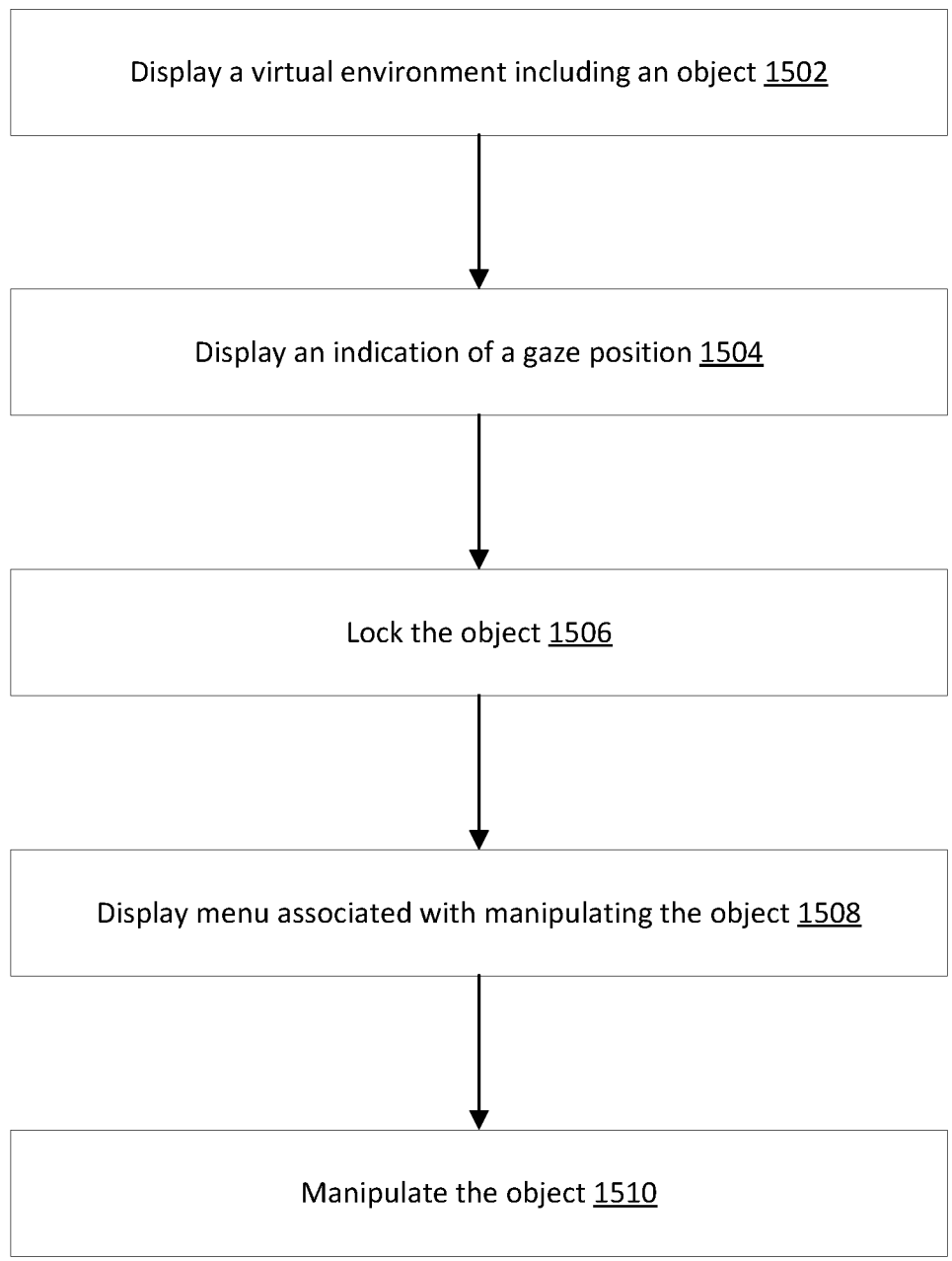
FIG. 15 shows a method for manipulating an object in a virtual environment.

FIG. 15 illustrates an example flow for manipulating an object in a virtual environment based on gaze information and physical controls on an external controller (e.g., a physical controller), according to embodiments of the present disclosure. The example flow starts at operation 1502, where a wearable computing device displays the virtual environment that includes the object. At operation 1504, the wearable computing device displays an indication of the user's gaze position in the virtual environment. For example, the wearable computing device tracks and maps the user's gaze to the virtual environment and displays a geometric shape at the gaze position as mapped in the virtual environment.

At operation 1506, the wearable computing device locks the virtual object. For example, the wearable computing device detects that the gaze position is on the object for a predefined period of time. In another example, the wearable computing device detects that the gaze position is within a predefined gaze region around the object and, in parallel, receives information from the external controller of a user interaction with the physical controller. In both examples, the wearable computing device selects the object and updates its parameters to indicate that it has been selected and is subject to manipulation.

At operation 1508, the wearable computing device displays a menu associated with manipulating the object. In an example, the wearable computing device presents the menu in proximity of the object in the virtual environment. This menu can correspond to a physical touch area on the physical controller with which the user is holding or interacting. For instance, the wearable computing device receives an identifier of the touch area from the external controller and accesses from memory a virtual model of the external controller and of the physical touch area. The virtual model can define the shape, size, look and feel, and functionalities of a corresponding virtual touch area. The wearable computing device presents this virtual touch area as the menu.

At operation 1510, the wearable computing device manipulates the object. In an example, the wearable computing device receives control information from the external controller based on user interaction with the physical touch area. Because the object is locked, the wearable computing device presents a virtual representation of the user interaction on the menu, manipulates the object based on the control information, and presents in the virtual environment the changes to the object as being manipulated.

Figure 16:
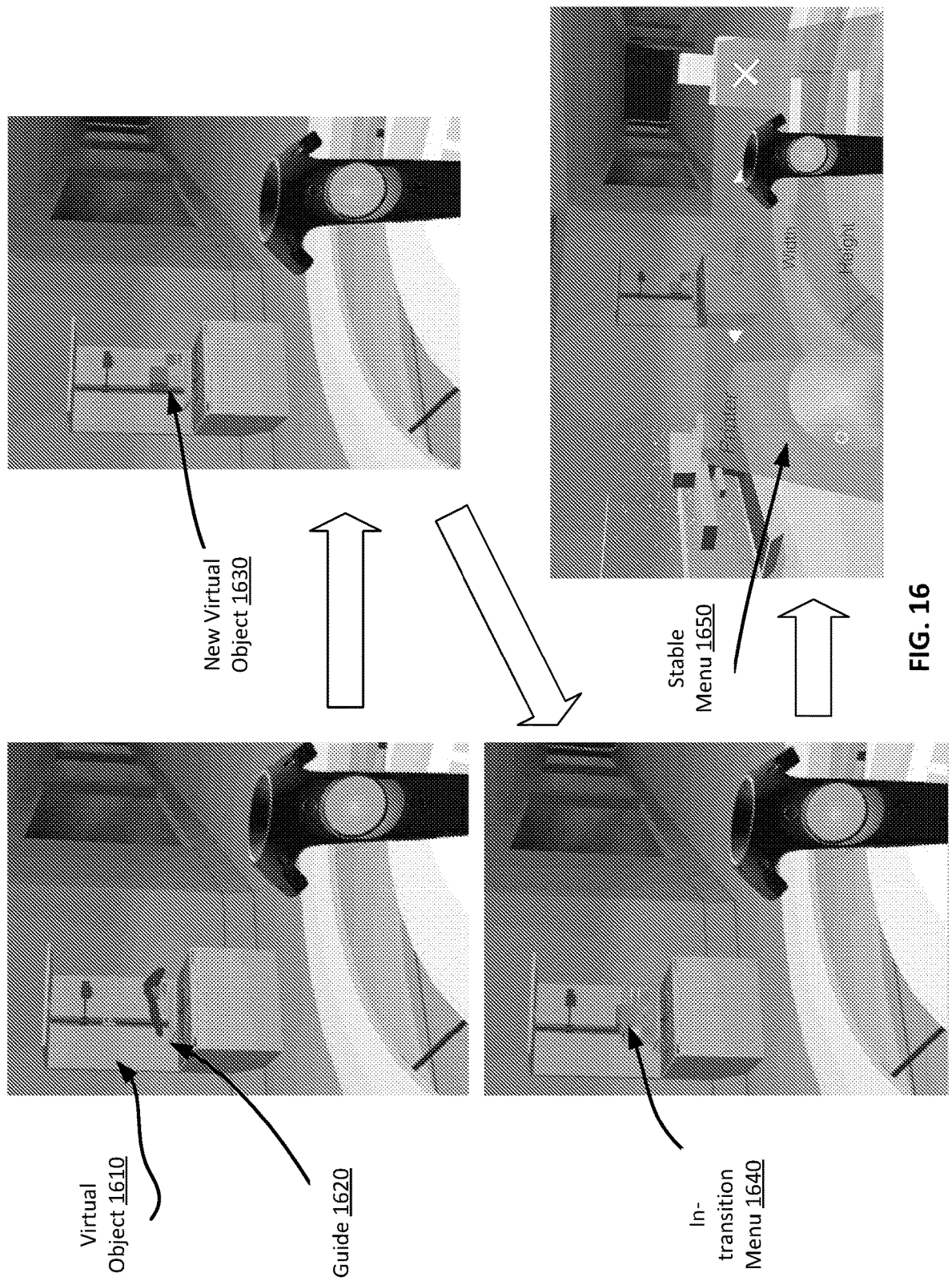
FIG. 16 shows an example of manipulating multiple objects in a virtual reality environment.

FIG. 16 illustrates an example of manipulating multiple objects in a virtual environment, according to embodiments of the present disclosure. Here, two objects are associated with each other: a three dimensional (3D) printer 1610 and a printed object 1630 (e.g., a box). The 3D printer 1610 can be manipulated in the virtual environment to print the printed object 1630. In other words, the creating of the second object 1630 depends on the manipulation of the first object 1610.

As illustrated in the top-left corner of FIG. 16, the wearable computing device detects the user's gaze over the object 1610 (the virtual 3D printer). Based on parameters of this object, a guide 1620 about using this object is presented. The guide 1620 presents information in the virtual environment about operating the external controller to interact with the object 1610.

In an example, the wearable computing device sets the guide 1620 to replicate at least the shape of the virtual controller (that, in turn, replicates the shape of the external controller). The operation information can be shown relative to the replicated shape. As illustrated in FIG. 16, the guide 1620 informs the user to "press" the blue touch area.

Once the user presses the corresponding touch area on the external controller, the wearable computing device receives an indication of this press therefrom. Because of the association between the virtual 3D printer and the virtual printed object, the wearable computing device generates and presents the object 1630 (e.g., the virtual printed object) in the object 1610 (e.g., in the virtual 3D printer), as illustrated in the top-right corner of FIG. 16.

At that point, the user can gaze at the object 1630 to lock it. Alternatively, the wearable computing device locks it automatically (without a specific gaze) based on the generation of the object 1630 since the user already pressed the blue touch area in order to print the printed object in the virtual environment. Once locked, the object 1630 can be manipulated.

Accordingly, the wearable computing device presents a menu to manipulate the object 1630. In an example, the wearable computing device receives, from the external controller, an indication of a user interaction with a physical touch area of the external controller. In response, the wearable computing device invokes and presents the menu. The presentation can be gradual such that the menu transitions from an initial state to a stable state (e.g., the menu transitions forward towards the user in the virtual environment).

The bottom-left corner of FIG. 16 shows the menu in transition from the initial state (shown as in-transition menu 1640). In transition, the menu is displayed in a first tilted angle. The wearable computing device updates the presentation of the menu such that it gradually moves towards the user's front field-of-view. During the movement of the menu, the tilted angle is adjusted to a second tilted angle until the end and stable placement in front of the user in the virtual environment. The bottom-right corner of FIG. 16 shows the menu in the stable state at the second tilted angle (shown as stable menu 1650).

Once fully displayed, the menu includes multiple components that can be arranged on one or more layers of the virtual environment. Some of these components can be objects that can be locked and manipulated. For example, based on detecting gaze position over the "width" component, the wearable computing device locks this component for manipulation. The manipulation can occur via user interaction with a touch area of the external controller.

Figure 17:
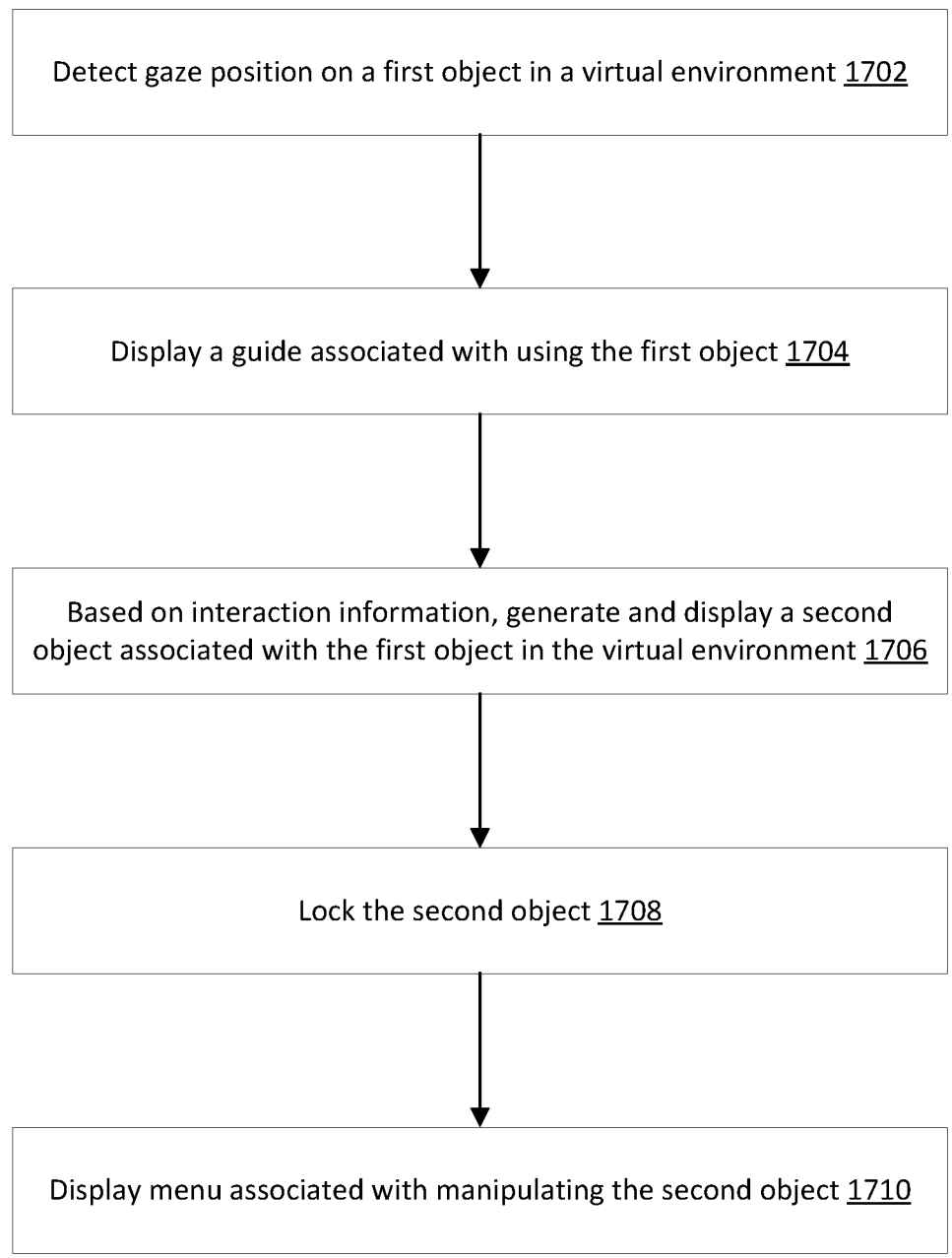
FIG. 17 shows a method for manipulating multiple objects in a virtual reality environment.

FIG. 17 illustrates an example flow for manipulating multiple objects in a virtual environment based on gaze information and physical controls on an external controller (e.g., a physical controller), according to embodiments of the present disclosure. The example flow starts at operation 1702, where a wearable computing device detects gaze position on a first object (e.g., a virtual 3D printer) in the virtual environment. At operation 1704, the wearable computing device displays a guide associated with using the first object. In an example, the guide is displayed based on parameters of the first object and its association with a second object (e.g., a virtual printed object). The guide shows information about using the external controller to manipulate the first object. For example, the guide informs the user about pressing physical controls (e.g., interacting with a physical touch area) to generate the second object.

At operation 1706, the wearable computing device displays the second object in the virtual environment based on interaction information. In an example, the interaction information includes control information provided from the external controller based on the user pressing the physical controls in response to the guide's information. The wearable computing device receives the interaction and generates and displays the second object accordingly.

At operation 1708, the wearable computing device locks the second object. In an example, the second object is locked automatically (e.g., without additional user input or user gaze) based on the second object being generated in response to receiving the interaction information.

At operation 1710, the wearable computing device displays a menu associated with manipulating the second object. In an example, the menu corresponds to a physical touch area of the external controller and facilitates manipulation of the second object based on user interactions with the physical touch area. Some or all components of the menu are also objects that can be locked based on detection of gaze of them and, once locked, can be manipulated based on user interaction with the physical touch area on the external controller.

Figure 18:
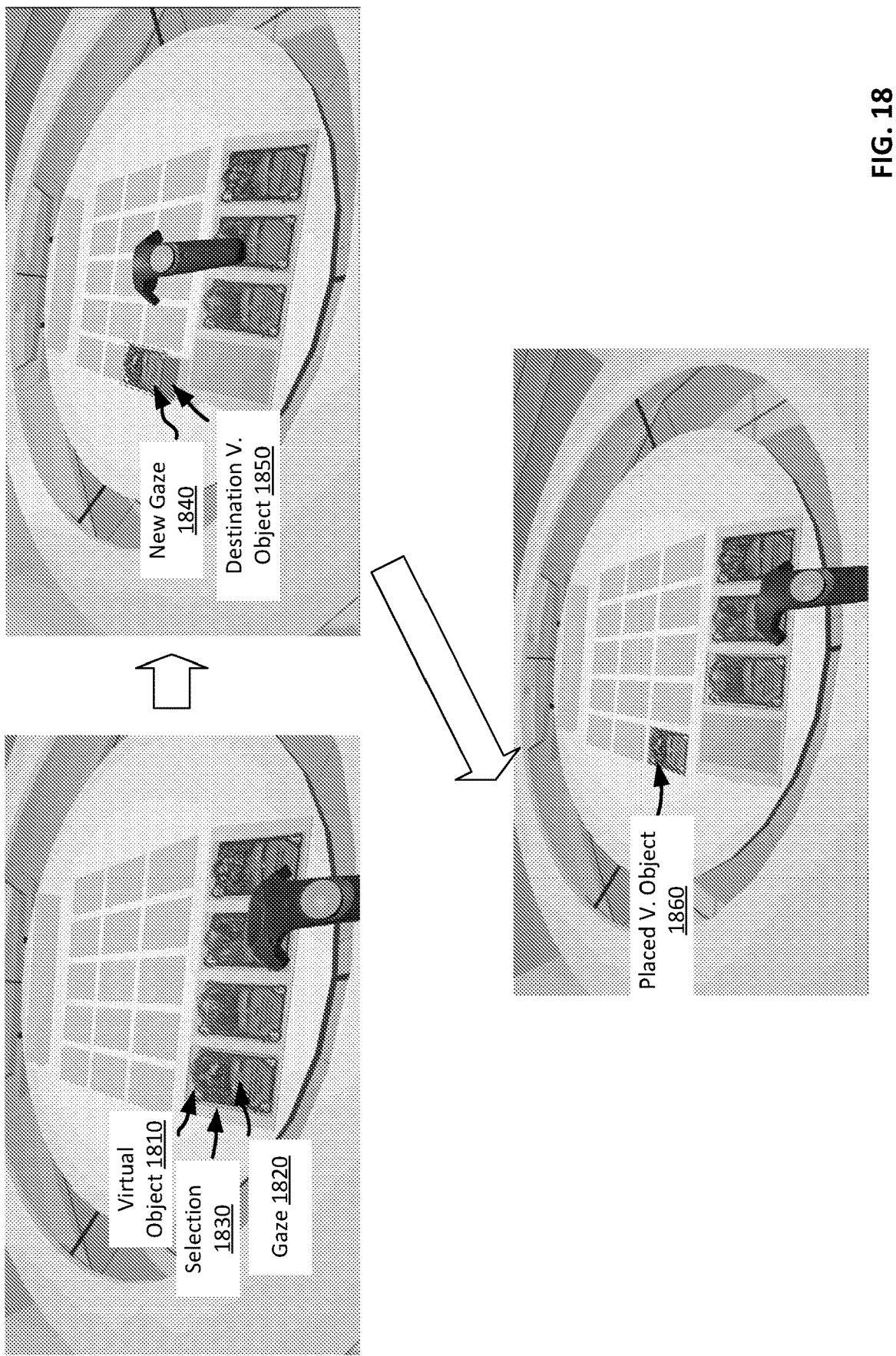
FIG. 18 shows another example of manipulating multiple objects in a virtual reality environment.

FIG. 18 illustrates another example of manipulating multiple objects in a virtual environment, according to embodiments of the present disclosure. Here, two objects are associated with each other: a card 1810 and a slot 1850 of a table. The card 1810 is a first object that has parameters specifying that it can be moved in the virtual environment and placed in the slot 1850. The slot is a second object that has parameters specifying that it is static in the virtual environment and that it can be a destination object for other objects (e.g., can receive the card 1810). In other words, the manipulation of the first object 1810 can involve a manipulation of the second object 1850.

As illustrated in the top-left corner of FIG. 18, the wearable computing device detects the user's gaze 1840 over the object 1810 (the card) for a predefined period of time. Based on parameters of this object, the object 1810 is selected. The wearable computing device shows the selection 1830 by highlighting the object 1810.

Next, the wearable computing device receives information from the external controller of a user interaction with a touch area of the external controller (e.g., a press on a button). The wearable computing device determines that this information corresponds to a hold of the object 1810 and according updates the presentation of the object 1810 to show that it is being held in the virtual environment.

Once held, the wearable computing device detects that the user's gaze moved away from the object 1810 (e.g., the card) to the destination object 1850 (e.g., the slot on the table for receiving the card). The far-right corner of FIG. 18 shows the updated gaze as element 1810 being positioned on the destination object 1850.

After the user's gaze at the destination object 1850, the wearable computing device may allow the user to gaze away and operate the external controller to move the object 1810 to the destination object 1850. Upon receiving information from the external controller of a user interaction with the touch area of the external controller (e.g., another button press), the determination is made that the object 1810 should be placed in the destination object 1850 and, accordingly, updates the virtual environment to show that the object 1810 was dropped in the destination object 1850, as shown with element 1860 of the bottom-center part of FIG. 18.

Figure 19:
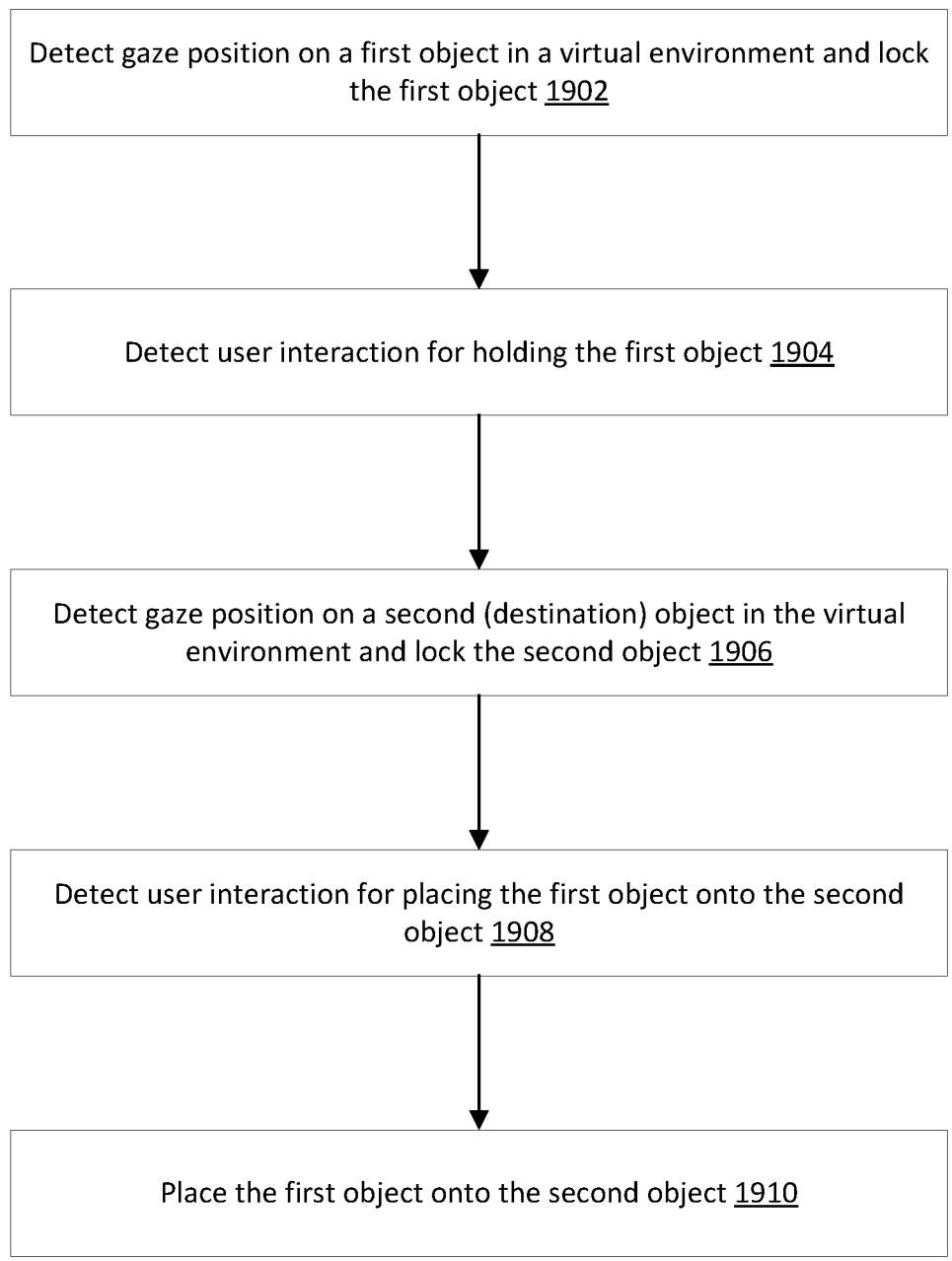
FIG. 19 shows another method for manipulating multiple objects in a virtual reality environment.

FIG. 19 illustrates another example of a flow for manipulating multiple objects in a virtual environment, according to embodiments of the present disclosure. Here, two objects are associated with each other such that a first object can be moved in proximity to (e.g., be placed in, on, under, etc.) a second object in the virtual environment.

The example flow starts at operation 1902, where a wearable computing device detects gaze position on the first object in the virtual environment for a predefined period of time. Accordingly, the wearable computing device locks the first object.

At operation 1904, the wearable computing device detects a user interaction for holding the first object in the virtual environment. For example, the computing device receives information from the external controller about the user interaction, where the user interaction is with a touch area of the external controller and indicates the hold. Accordingly, the wearable computing device updates parameters of the first object and its presentation in the virtual environment to reflect the hold.

At operation 1906, the wearable computing device detects gaze position on the second object in the virtual environment for a predefined period of time. Accordingly, the wearable computing device locks the second object.

At operation 1908, the wearable computing device detects a user interaction for placing the first object onto the second object. For example, the computing device receives information from the external controller about the user interaction, where this interaction is with the touch area of the controller and indicates the placement.

At operation 1910, the wearable computing device places the first object onto the second object based on the detected user. For example, the wearable computing device updates parameters of the first object and its presentation in the virtual environment to reflect the placement.

Figure 20:
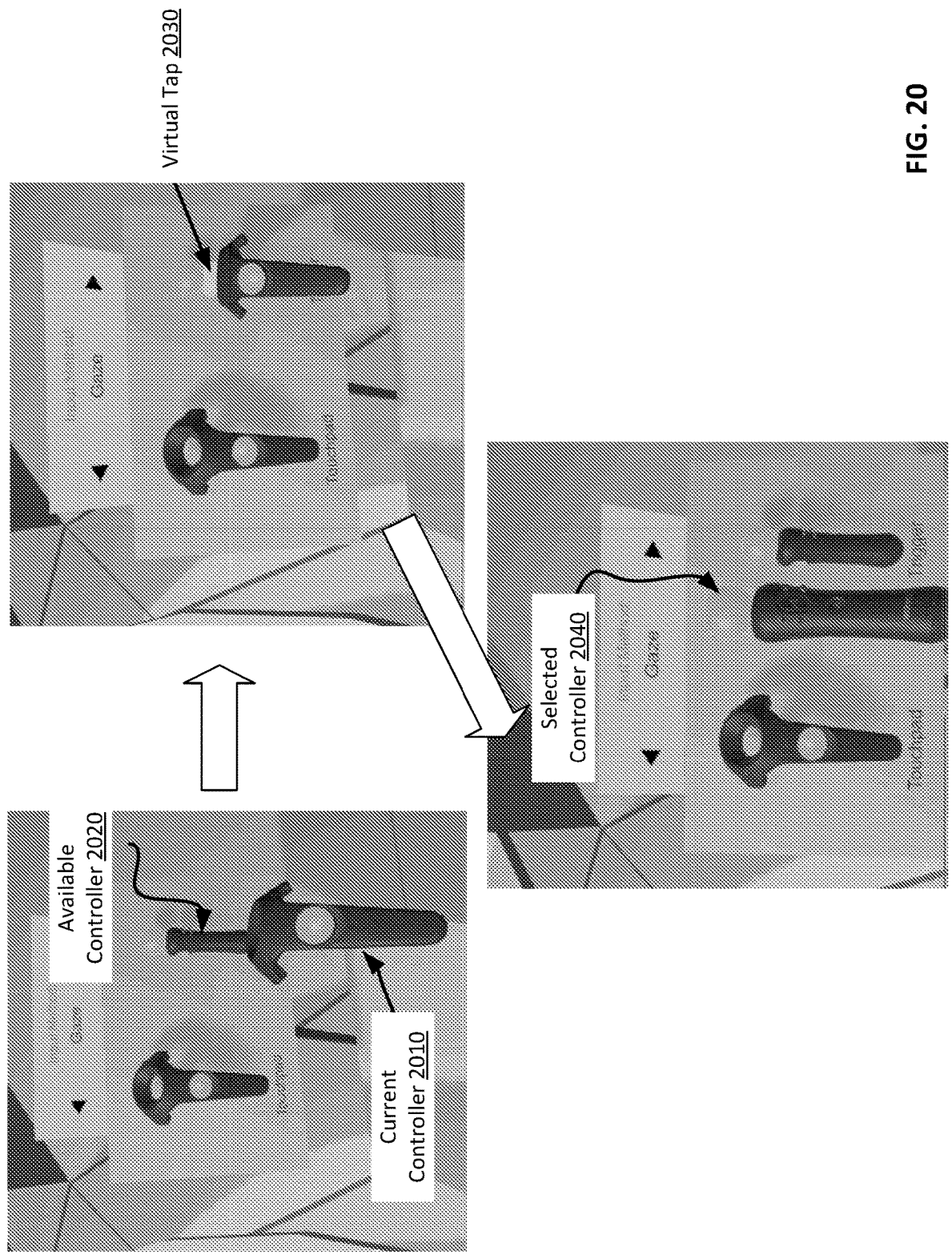
FIG. 20 shows an example of changing controllers in a virtual environment.

FIG. 20 illustrates an example of changing controllers in a virtual environment, according to embodiments of the present disclosure. Here, two objects are associated with each other: a current controller 2010 and an available controller 2020. These two objects are mutually exclusive from being usable in the virtual environment. In other words, the user is permitted to only be using one of them at any time in the virtual environment.

In an example, the user may be using an external controller and the wearable computing device can present a corresponding controller in the virtual environment. The user may change the external controller to another one. The wearable computing device would change the controller in the virtual environment accordingly. Alternatively, the user may be using a generic external controller that can be mapped to different virtual models stored in local memory, or accessible via remote memory to the wearable computing device. The wearable computing device presents these different virtual models as available controllers in the virtual environment and allows the user to switch between them.

As illustrated in the top-left corner of FIG. 20, the wearable computing device displays the current controller 2010 that the user is operating in the virtual environment and other available controller(s) 2020 for selection. As illustrated in the top-right corner of FIG. 20, to switch from the current controller 2010 to an available controller 2020, the user operates the external controller such that, in the virtual environment, the current controller 2010 is moved towards the position of the available controller 2020. For example, the wearable computing device receives information from the external controller indicating a user interaction with a touch area of the external controller or the external controller itself, where the user interaction is for moving the current controller 2010 towards available controller 2020. Based on this information, the wearable computing device updates the parameters and the presentation of the current controller 2010 to show this movement in the virtual environment.

To switch to the available controller 2020, the user may need to punch or tap the available controller. Here also, the user operates the external controller to perform this operation in the virtual environment and the wearable computing device receives the relevant information from the external controller and updates the virtual environment. As shown in the top-right corner of FIG. 20, the wearable computing device highlights the virtual punch or tap 2030 by changing the visual properties of the available controller 2420 (e.g., by setting its color to bright or to flash).

Once the available controller 2020 is selected (shown as selected controller 2040 in the bottom-center part of FIG. 20), the current controller 2010 is replaced with the selected controller 2040. In an example, the current controller 2010 is an object presented in a top layer of the virtual environment. The available controller 2020 is also another object presented, prior to the selection, in a lower layer of the virtual environment. Based on the selection, the wearable computing device dismisses (e.g., removes from the presentation) the object representing the current controller 2010 from the top layer and adds the object representing the available controller 2020 in this top layer. Alternatively, rather than removing and adding, the wearable computing device changes the parameters of the object in the top layer from those of the current controller 2010 to the parameters of the available controller 2020.

Figure 21:
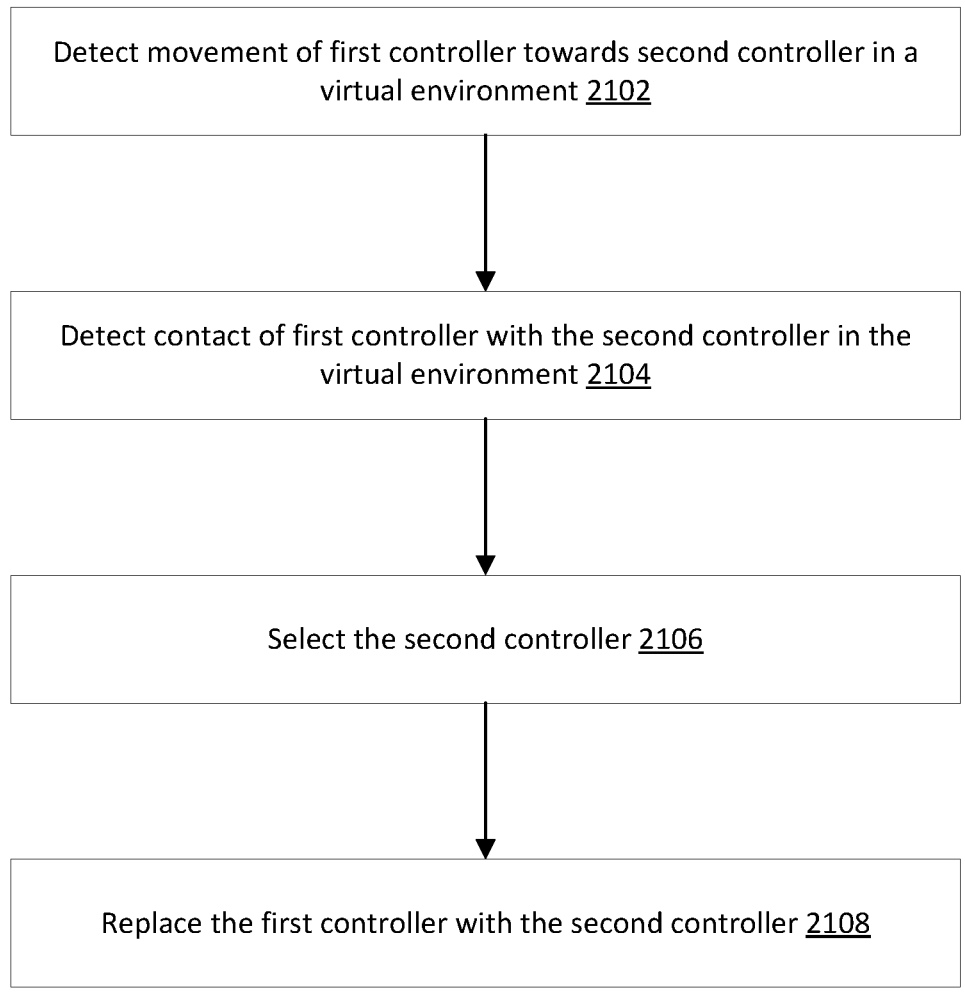
FIG. 21 shows a method for changing controllers in a virtual environment.

FIG. 21 illustrates an example of a flow for changing controllers in a virtual environment, according to embodiments of the present disclosure. The example flow starts at operation 2102, where a wearable computing device detects movement of a first controller towards a second controller in the virtual environment. For example, the computing device receives information from the external controller about a user interaction with a touch area of the external controller or the external controller itself, where the user interaction indicates the movement. Accordingly, the wearable computing device updates parameters of the first controller and its presentation in the virtual environment to reflect the movement.

At operation 2104, the wearable computing device detects contact (e.g., virtual contact) of the first controller with the second controller in the virtual environment. This contact corresponds to a virtual punch or tap. For example, the computing device receives information from the external controller about a user interaction with the touch area of the external controller, where the user interaction indicates the virtual contact.

At operation 2106, the wearable computing device selects the second controller based on the virtual contact. At operation 2108, the wearable computing device replaces the first controller with the second controller in the virtual environment.

Figure 22:
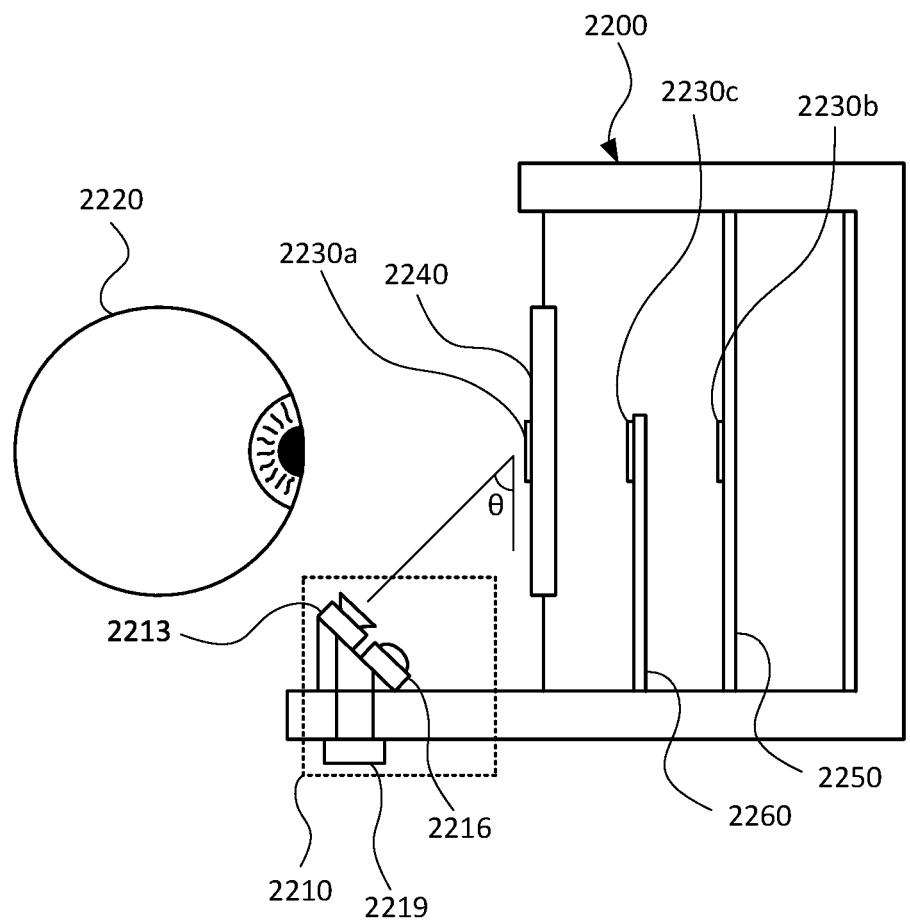
FIG. 22 shows a schematic example of a wearable apparatus demonstrating one embodiment of the invention.

FIG. 22 shows a schematic example of a wearable apparatus 2200 demonstrating an embodiment of the invention. In some embodiments, wearable apparatus 2200 may be an augmented reality or virtual reality headset. In this embodiment, wearable apparatus 2200 is shown as one type of a virtual reality headset.

Wearable apparatus 2200 may include an eye tracking device 2210 which includes at least at least one image sensor 2213 and at least one illuminator 2216 (referred to herein as image sensor 2213 and illuminator 2216, respectively). Eye tracking device 2210 may also include one or more processors 2219, or a connection to one or more processors remote from eye tracking device 2210 and/or apparatus 2200, but performing the same and/or similar functions (all referred to herein as processor 2219).

Illuminator 2216 may transmit one or more wavelengths of light, and image sensor 2213 may be configured or selected to be responsive to corresponding wavelengths. In some embodiments, the light provided by illuminator 2216 may be in the infrared wavelength, and consequently image sensor 2213 may be response to infrared wavelength light.

Eye tracking device 2210 may be configured to selectively activate illuminator 2216 to illuminate at least one eye 2220 of the user of wearable apparatus 2200. Processor 2219 may analyze images of the illuminated eye 2220 and determine a gaze direction of eye 2220 based therefrom.

Wearable apparatus 2200 may also include at least one holographic film 2230 disposed at some location on wearable apparatus 2200. In the example shown, holographic film 2230 is shown in three possible locations on wearable apparatus 2200. In a first possible location, holographic film 2230a is shown on a lens 2240 of wearable apparatus 2200.

In a second possible location, holographic film 2230b is shown on a display 2250 of wearable apparatus 2200. In a third possible location, holographic film 2230c is shown on a stand-alone (non-lens) portion 2260 of wearable apparatus 2200. In practice only one holographic film 2230 may be present. In some embodiments, multiple distinct holographic films 2230 may be present. In various embodiments, image sensor 2213 may be positioned at an angle (θ) relative to normal of the gaze ray's incidence with holographic film 2230. In some embodiments, θ may be between about 5 degrees and about 75 degrees.

Additionally, note that the orientation and placement of eye tracking device 2210 (and consequently image sensor 2213 and/or illuminator 2216), as well as holographic film 2230 may be modified from this example in a given embodiment. For example, illuminator 2216 may be positioned relatively remote from image sensor 2213, and more directly address eye 2220, with light reflected from eye being reflected again by holographic film 2230 toward image sensor 2213. Furthermore, in different apparatuses than virtual reality headsets, holographic film 2230 may be disposed on other portions of such apparatuses (i.e., a light-guide of an augmented reality headset).

Holographic film 2230 may be any sort of film which allows for holographic patterns and images to be presented thereon. Example materials for holographic film 2230 include polyester, polypropylene, nylon, and/or other polymers. In some embodiments, a surface reflection hologram is employed, where patterns and images may be embossed thereon, possibly via creation of tiny grooves cut into the film at various angles and in different shapes. This allows for the presentation of patterns and images which may have a three-dimensional effect. In other embodiments, a volumetric reflection hologram may be employed, where the hologram is created by exposing holographic film with light that selectively changes the refractive index of the film.

Reflections of patterns and images may be specular or diffuse. Specular reflections proceed from holographic film 2230 in a single direction, while diffuse reflections proceed from holographic film 2230 in multiple/many directions. Holographic film 2230 with either or both type of reflectivity may be employed as will be discussed below.

When holographic film 2230 with specular reflections is employed, holographic film 2230 must be disposed on portions of apparatus 2200 where the reflective angles relative to image sensor 2213 and illuminator 2216 are such that image sensor 2213 will indeed be able to detect reflections on holographic film 2230 from illuminator 2216. When holographic film 2230 with diffuse reflections is employed, a broader range of relative positions of image sensor 2213, illuminator 2216, and holographic film 2230 are possible.

In an activity outside the normal process of using eye tracking device 2220 to determine a gaze direction of eye 2220, processor 2219 may also be configured to activate illuminator 2216 to illuminate holographic film 2230 and capture, with image sensor 2213, an image of at least a portion of holographic film 2230 while holographic film 2230 is illuminated. Processor 2219 may then determine a characteristic of holographic film 2230 based on the image. For example, processor 2219 may determine the size and relative positions of different reflective portions of holographic film 2230.

Based on the determined characteristics of holographic film 2230, processor 2219 may then determine a location, an orientation, and/or other characteristic of image sensor 2213 relative to holographic film 2230 (or a some critical sub-component of image sensor 2213; for example, a lens, a charge-coupled device (CCD), active pixel sensor, etc.). Processor 2219 may then be configured to change at least one calibration parameter of image sensor 2213, based on at least one of the location, orientation, or other characteristic.

Alternatively, processor 2219 may send data regarding the location, orientation, and/or other characteristic to image sensor 2213 for use by image sensor 2213 to change at least one calibration parameter of itself. In a further alternative, processor 2219 may use data regarding the location, orientation, and/or other characteristic to calibrate an algorithm used by processor 2219 to determine gaze direction using image sensor 2213 and illuminator 2216. The calibration parameters adjusted could include, merely by way of example, an imaging parameter, a focal length, a distortion parameter, an illumination parameter, an orientation of the image sensor relative to the hologram, a field of view, a distance to the hologram, and/or an angle of the image sensor relative to holographic film 2230.

Holographic film 2230 may have varied reflective characteristics, each of which may be sufficient to implement embodiments of the invention described. In order for an image of reflective light from holographic film 2230 to be sufficient to determine a location and/or orientation of image sensor 2213 therefrom, characteristics in at least two orthogonal axes must be present. In some embodiments, a single feature having two dimensional characteristics will be provided. In other embodiments, two or more features may be present which have combined two dimensional characteristics.

FIGS. 23A-F show a variety of holographic films with different characteristics which could be used to implement embodiments of the invention. Other variations are possible. Hatched portions of these figures represent a first reflective portion thereof, while non-hatched portions represent a second reflective portion. However, the reflection angle of the first reflective portion may be different than the reflection angle of the second reflective portion. Alternatively, hatched or non-hatched portions of the figures could represent non-reflective areas of the film. I.e., a hole or cavity in the holographic film/mirror, also useful for calibration based on the characteristics thereof (size, location, etc.). In some embodiments, the non-hatched portions could reflect images of the eye for gaze detection, while the hatched portions could provide a specular reflection toward image sensor 2213 for use in calibration as discussed herein. While more complex and larger markers on the holographic films can provide more information and lead to more exactly determined locations/orientations of image sensor 2213, smaller markers will reduce the possibility of image sensor 2213 being saturated by reflective light, likely making data therefrom less or not usable.

Figure 23A:
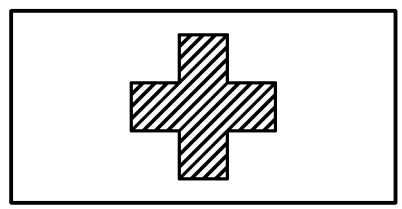
FIGS. 23A-F shows example holographic films with reflective markers thereon.

FIG. 23A shows a holographic film with a marker that has two dimensional characteristics. This marker could be presented diffusely or specularly depending on placement of illuminator 2216 and image sensor 2213. Diffuse markers may be made in any way known in the art, or that becomes known in the art in the future.

Figure 23B:
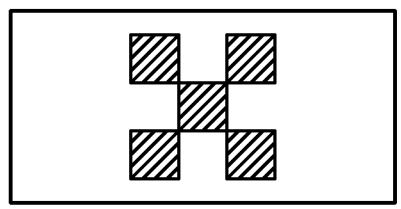

FIG. 23B shows an alternative marker that also has two dimensional characteristics. This marker could also be presented diffusely or specularly depending on placement of illuminator 2216 and image sensor 2213.

Figure 23C:
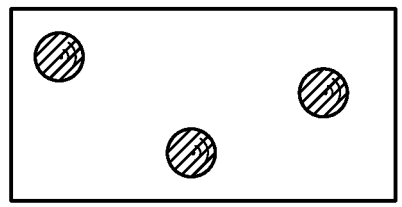

FIG. 23C shows another marker whereby at least three holographic spheres are presented. Reflections of illumination of the spheres provide three generally point locations in a two dimensional layout. Overall reflections from the spheres would be spread in different directions due to the rounded nature of the holographic spheres. Larger spheres would provide more reflective light, but less accuracy than smaller spheres which would provide less reflective light, but with increased accuracy. Other three dimensional holographic markers may also be employed.

Figure 23D:
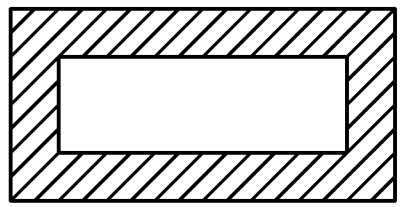

FIG. 23D shows another possible marker where both the dimensions of the illuminated area, as well as the implicit dimensions of the non-illuminated area could function as characteristics useable by the systems and methods of the invention to determine location and/or orientation of the image sensor 2213. This marker could also be presented diffusely or specularly depending on placement of illuminator 2216 and image sensor 2213.

Figure 23E:
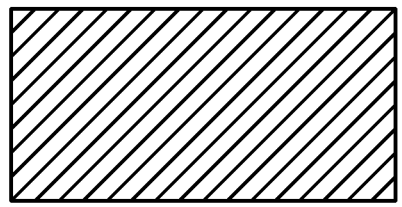

FIG. 23E shows another marker whereby the overall dimensions of the entirely reflective holographic film provide the necessary two dimensional characteristics. This marker could also be presented diffusely or specularly depending on placement of illuminator 2216 and image sensor 2213.

Figure 23F:
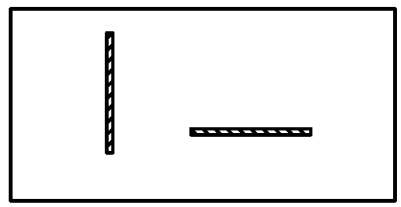

FIG. 23F shows another marker having two single dimension (or nearly single dimension) marks whereby the length of the marks, as well as their relative placement to each other provide the necessary two dimensional characteristics. This marker could also be presented diffusely or specularly depending on placement of illuminator 2216 and image sensor 2213.

The disclosure has now been described in detail for the purposes of clarity and understanding. However, it will be appreciated that certain changes and modifications may be practiced within the scope of the appended claims.

The above description provides exemplary embodiments only, and is not intended to limit the scope, applicability or configuration of the disclosure. Rather, the above description of the exemplary embodiments will provide those skilled in the art with an enabling description for implementing one or more exemplary embodiments. It being understood that various changes may be made in the function and arrangement of elements without departing from the spirit and scope of the disclosure as set forth herein.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the disclosure may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the disclosure may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor or processors may perform the necessary tasks.

As used herein, the phrase "a first thing based on a second thing," and the like, may mean that the first thing is based solely on the second thing, or that the first thing is based on the second thing as well as one or more additional things.

The invention claimed is:

1. An augmented reality, virtual reality, or other wearable apparatus comprising:
   a holographic film disposed on a wearable apparatus;
   an eye tracking device comprising an image sensor and an illuminator; and one or more processors configured to at least:
      activate the illuminator to illuminate the holographic film, wherein the illuminator is arranged to create a glint at the eye;
      capture, with the image sensor, an image of at least a portion of the holographic film while the holographic film is illuminated;
      determine a characteristic of the holographic film based on the image;
      determine, based on the characteristic of the holographic film, at least one of a location or an orientation of the image sensor relative to the holographic film; and
      change, based on at least one of the location or the orientation of the image sensor relative to the holographic film, at least one calibration parameter of the image sensor.

2. The augmented reality, virtual reality, or other wearable apparatus of claim 1, wherein the image comprises:
   a reflection of light off the holographic film.

3. The augmented reality, virtual reality, or other wearable apparatus of claim 2, wherein the reflection comprises:
   a diffuse reflection from a feature of the holographic film.

4. The augmented reality, virtual reality, or other wearable apparatus of claim 2, wherein the reflection comprises:
   a specular reflection of a feature of the holographic film.

5. The augmented reality, virtual reality, or other wearable apparatus of claim 1, wherein the image comprises:
   a diffuse reflection of light surrounding an area having no reflection of light.

6. The augmented reality, virtual reality, or other wearable apparatus of claim 1, wherein the image comprises:
   a diffuse reflection of light bounded by an edge of the holographic film.

7. The augmented reality, virtual reality, or other wearable apparatus of claim 1, wherein determining the location or the orientation of the image sensor relative to the holographic film comprises:
   determining the location or the orientation of the image sensor in relation to three orthogonal axes.

8. The augmented reality, virtual reality, or other wearable apparatus of claim 7, wherein the holographic film comprises:
   three characteristics disposed in two axes in the holographic film which specularly reflect light toward the image sensor.

9. The augmented reality, virtual reality, or other wearable apparatus of claim 7, wherein the holographic film comprises:
   only one characteristic which reflects light, wherein the characteristic is two-dimensional.

10. The augmented reality, virtual reality, or other wearable apparatus of claim 7, wherein the holographic film comprises:
    at least one characteristic which does not reflect light, wherein at least some portion of the at least one characteristic is bounded by reflective portions of the holographic film, and wherein the at least one characteristic is two-dimensional.

11. A method for changing at least one calibration parameter of an image sensor in an eye tracking device of an augmented reality, virtual reality, or other wearable apparatus, the method comprising:
    activating an illuminator of an eye tracking device to illuminate a holographic film disposed on a wearable apparatus, wherein the illuminator is arranged to create a glint at the eye;
    capturing, with an image sensor of the eye tracking device, an image of at least a portion of the holographic film while the holographic film is illuminated;
    determining a characteristic of the holographic film based on the image;
    determining, based on the characteristic of the holographic film, at least one of a location or an orientation of the image sensor relative to the holographic film; and
    changing, based on the location or the orientation of the image sensor relative to the holographic film, at least one calibration parameter of the image sensor.

12. The method for changing at least one calibration parameter of an image sensor in an eye tracking device of an augmented reality, virtual reality, or other wearable apparatus of claim 11, wherein the image comprises:
    a reflection of light off the holographic film, and wherein the reflection comprises a diffuse reflection from a feature of the holographic film or a specular reflection of a feature of the holographic film.

13. The method for changing at least one calibration parameter of an image sensor in an eye tracking device of an augmented reality, virtual reality, or other wearable apparatus claim 11, wherein the image comprises:
    a diffuse reflection of light surrounding an area having no reflection of light.

14. The method for changing at least one calibration parameter of an image sensor in an eye tracking device of an augmented reality, virtual reality, or other wearable apparatus of claim 11, wherein the image comprises:
    a diffuse reflection of light bounded by an edge of the holographic film.

15. The method for changing at least one calibration parameter of an image sensor in an eye tracking device of an augmented reality, virtual reality, or other wearable apparatus of claim 11, wherein determining the location or the orientation of the image sensor relative to the holographic film comprises:
    determining the location or the orientation of the image sensor in relation to three orthogonal axes.

16. A non-transitory machine-readable medium having instructions stored thereon for changing at least one calibration parameter of an image sensor in an eye tracking device of an augmented reality, virtual reality, or other wearable apparatus, wherein the instructions are executable by one or more processors to at least:
    activate an illuminator of an eye tracking device to illuminate a holographic film disposed on a wearable apparatus, wherein the illuminator is arranged to create a glint at the eye;
    capture, with an image sensor of the eye tracking device, an image of at least a portion of the holographic film while the holographic film is illuminated;
    determine a characteristic of the holographic film based on the image;
    determine, based on the characteristic of the holographic film, at least one of a location or an orientation of the image sensor relative to the holographic film; and
    change, based on the location or the orientation of the image sensor relative to the holographic film, at least one calibration parameter of the image sensor.

17. The non-transitory machine-readable medium of claim 16, wherein the image comprises:
    a reflection of light off the holographic film, and wherein the reflection comprises a diffuse reflection from a feature of the holographic film or a specular reflection of a feature of the holographic film.

18. The non-transitory machine-readable medium of claim 16, wherein the image comprises:
    a diffuse reflection of light surrounding an area having no reflection of light.

19. The non-transitory machine-readable medium of claim 16, wherein the image comprises:
    a diffuse reflection of light bounded by an edge of the holographic film.

20. The non-transitory machine-readable medium of claim 16, wherein determining the location or the orientation of the image sensor relative to the holographic film comprises:
    determining the location or the orientation of the image sensor in relation to three orthogonal axes.

* * * * *